US006014228A

United States Patent [19]
Castro

[11] Patent Number: 6,014,228
[45] Date of Patent: Jan. 11, 2000

[54] METHOD AND APPARATUS FOR DELIVERING SECURED HARD-COPY FACSIMILE DOCUMENTS

[75] Inventor: Peter D. Castro, New York, N.Y.

[73] Assignee: International Integrated Communications, Ltd., New York, N.Y.

[21] Appl. No.: 08/893,910

[22] Filed: Jul. 11, 1997

Related U.S. Application Data

[63] Continuation of application No. 08/544,609, Oct. 18, 1995, abandoned, which is a continuation of application No. 08/137,446, Oct. 15, 1993, abandoned, which is a continuation of application No. 07/651,027, Feb. 5, 1991, Pat. No. 5,255,106.

[51] Int. Cl.[7] ................................................ G03B 27/00
[52] U.S. Cl. ............................ 358/400; 358/402; 380/18
[58] Field of Search ........................... 358/400, 402–403, 358/434, 438, 440; 380/18, 54–55; 283/94, 98, 101, 103–105

[56] References Cited

U.S. PATENT DOCUMENTS

| | | | |
|---|---|---|---|
| 3,255,439 | 6/1966 | Simjian | 340/825 |
| 3,373,989 | 3/1968 | La Baron | 271/2 |
| 4,414,579 | 11/1983 | Dattilo et al. | 358/300 |
| 4,682,954 | 7/1987 | Cook | 380/54 |
| 4,866,761 | 9/1989 | Thornborough et al. | 358/402 |
| 4,896,355 | 1/1990 | Iggulden et al. | 380/54 |
| 4,956,721 | 9/1990 | Tasaki et al. | 358/402 |
| 4,965,821 | 10/1990 | Bishop et al. | 379/91 |
| 5,001,749 | 3/1991 | Iggulden et al. | 380/18 |
| 5,255,106 | 10/1993 | Castro | 358/400 |

*Primary Examiner*—Thomas D Lee
*Assistant Examiner*—Stephen Brinich
*Attorney, Agent, or Firm*—Wopgood, Calimafde Kalil & Judlowe LLP

[57] ABSTRACT

Method and apparatus are provided for delivering hard-copy facsimile documents, the confidential information of which is visibly concealed. In general, the apparatus includes a facsimile message concealing mechanism which cooperates with a facsimile message recording unit to produce secured hard-copy facsimile documents. In one embodiment, the apparatus is the form of a facsimile machine having facsimile transmission and reception capabilities. Facsimile messages to be transmitted are encoded with one or more command codes which are sent with the facsimile message. At a receiving station suitably adapted to the transmission scheme, the command codes are decoded to reveal specific instructions and message data. Using this decoded information, the receiving station executes the transmitted command, such as concealing the recorded facsimile message, to produce a secured hard-copy facsimile document. In an alternative embodiment, a facsimile accessory device is provided which operably associates with conventional facsimile machines, so as to receive ejected facsimile sheets, recognize symbol command codes reproduced thereon, and execute the recognized command, such as concealing confidential information on the recorded facsimile sheets.

67 Claims, 23 Drawing Sheets

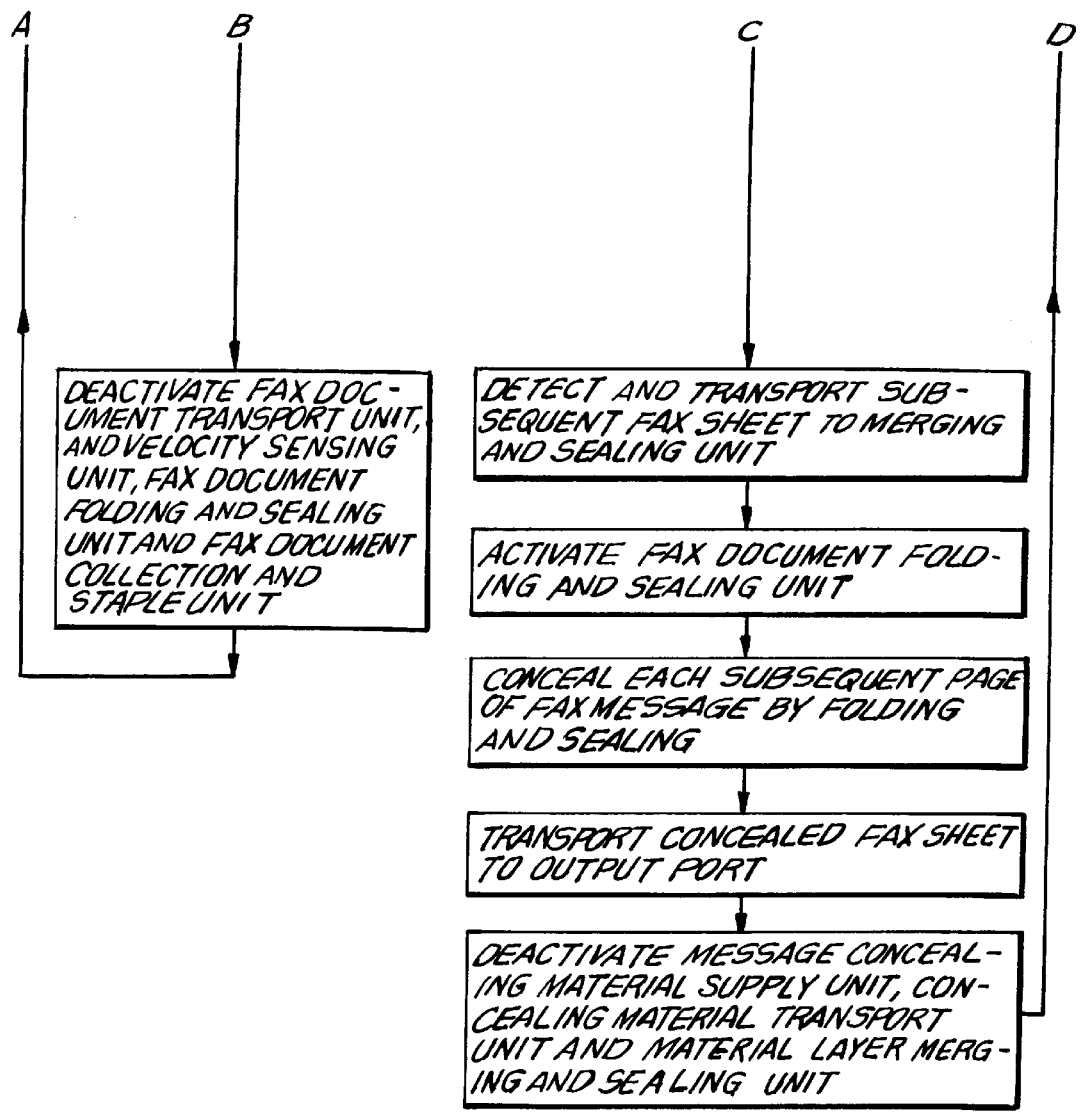
FIG.IOB'

METHOD AND APPARATUS FOR DELIVERING SECURED HARD-COPY FACSIMILE DOCUMENTS

This is a continuation of application Ser. No. 08/544,609, filed Oct. 18, 1995, now abandoned which is a continuation of application Ser. No. 08/137,446 filed on Oct. 15, 1993 now abandoned; which is a continuation of application Ser. No. 07/651,027 filed on Feb. 5, 1991, now U.S. Pat. No. 5,255,106 issued Oct. 19, 1993.

BACKGROUND OF THE INVENTION

1. Field of Invention

The present invention relates to a method and apparatus for transmitting and delivering a confidential message or document in a manner which prevents access to the contents without producing visible evidence of tampering.

2. Brief Description of the Prior Art

Over the centuries, written communication has become essential to conducting both business and personal affairs.

As the subject matter of these communications became increasingly private in nature, there arose a problem regarding their confidential transmission. Short of folding, sealing or encapsulating the message in a sealed tube for delivery, the integrity of those involved in the transmission and delivery of the message was relied upon for preserving confidentiality. A natural solution to this problem was provided in large part by the envelope. To date, the envelope, in its numerous embodiments, is the method of choice to ensure confidentiality through the delivery process.

With the advent of telegraphy and telegraphic messages, such as telegrams, an additional technique of message transmission was established. However, the need for preserving confidentiality rendered this communication technique less than desirable. In response to this problem, U.S. Pat. No. 2,396,833 discloses a telegraph receiving blank adapted to conceal the body of the recorded message, thereby preventing unauthorized access during handling and delivery. In the decades following the developing of the above-mentioned telegraph receiving blank, a variety of facsimile machines have been developed which incorporate printers utilizing thermally sensitive paper. Machines of this type, however, have been generally adapted to receive and print messages of varying length and thereafter automatically cut the thermally sensitive paper at the end of the message. Consequently, the continuous strip of recording blanks proposed in U.S. Pat. No. 3,296,833, cannot be utilized with thermal printing facsimile machines since the severing operation, occurring at arbitrary points along the continuous strip, frequently severs the sealed blank along the message recording area.

With similar security concerns in mind, U.S. Pat. No. 3,261,911 broadly describes a prior art transmission system for use in modernizing the postal delivery system. Generally, the proposed facsimile transmission system contemplated the use of a central transmitting station at which sealed mail envelopes were mechanically opened with automated equipment, then scanned to produce facsimile messages which would then be transmitted to a remotely located central receiver station. At the central receiver station, the received facsimile message would then be automatically reproduced and mechanically enclosed in an enclosure which was addressed and subsequently sealed. Thereafter, the enclosed addressed envelope could be picked up by or physically delivered to the addressee in the normal course of mail delivery. This proposed system was generally rejected by the postal system for having a number of shortcomings and drawbacks. In particular, this proposed system was deemed inherently prone to mechanical breakdown and the likelihood of concomitant loss of facsimile messages, and thus was essentially abandoned.

As an alternative to the above described system, U.S. Pat. No. 3,261,911 proposes a system for transmitting imprinted intelligence, in which an intelligence bearing message to be transmitted is placed in a sealed enclosure opaque to visible light. The opaque sealed enclosure is then scanned at the transmitting location using x-radiation to produce an intelligence bearing signal. The intelligence bearing signal is then transmitted over a communication medium to a remote location. At the remote location, a converter converts the intelligence bearing signal into a voltage, which is used to reproduce the original intelligence upon voltage sensitive paper sealed within an enclosure also opaque to visible light. While such a system does provide a way of ensuring confidentiality of facsimile messages, it nevertheless requires necessarily complex equipment and technical measures.

As with previous technology involving written communication, present day facsimile machines have not been without concern regarding confidentiality.

In particular, prior art techniques have been proposed involving the use of facsimile machines having "electronic mailbox" capabilities, to secure facsimile transmissions. In such systems, confidential messages destined for a particular individual are not printed upon receipt, rather they are stored in an assigned electronic mailbox or memory location within the facsimile machine. When the individual desires to read his or her mail, an assigned access or security code is inserted, whereupon the stored messages are printed. While such techniques can provide a certain degree of confidentiality, they require that the recipient or an authorized agent access the stored messages from the facsimile machine.

Thus, while several approaches have been proposed for preventing casual reading of confidential messages, such techniques have suffered from shortcomings and drawbacks of the type described above.

As a result, there remains a need for improved facsimile apparatus capable of delivering hard-copy facsimiles in a manner which prevents casual reading of the contents.

Accordingly, it is a primary object of the present invention to provide a method and apparatus for delivering secured hard-copies of confidential messages in a manner which overcomes the shortcomings and drawbacks of prior art methodologies and apparatus.

Another object of the present invention is to provide a method and apparatus for delivering facsimile documents to remote locations at the speed of facsimile signals and over public telecommunication systems, with the information content of the facsimile document being maintained confidential as done in normal postal and courier service operations.

It is a further object of the present invention to provide such apparatus in the form of a single facsimile transmitting and receiving unit which uses encoding and decoding technology to selectively encode facsimile data signals with command codes indicative of predefined operations to be enabled or disabled at a selected receiving station.

It is a further object of the present invention to provide such apparatus in the form of a single facsimile transmitting and receiving unit which uses symbol recognition technology to determine whether the facsimile message is to be reproduced as a secured, hard-copy document.

It is a further object of the present invention to provide such apparatus in the form of a single facsimile transmitting and receiving unit which uses signal decoding technology to determine whether the facsimile message is to be reproduced as secured, hard-copy document.

It is a further object of the present invention to provide such a facsimile transmitting and receiving unit, in which confidential messages of any length, can be electronically transmitted and subsequently reproduced as a secured, hard-copy facsimile.

Still a further object of the present invention is to provide such a facsimile transmitting and receiving unit, in which the hard-copy facsimile document can be concealed so that a non-confidential portion of the facsimile message is rendered visible, while a confidential message portion is concealed in a manner that would provide visual evidence of tampering.

It is a further object of the present invention to provide such a facsimile transmitting and receiving unit having a charge metering control mechanism in which charge data stored in the facsimile unit enables the controlled operation of the transmitting component of the facsimile unit so long as metered accumulation of computed charge does not exceed a preallocated charge remotely delivered to the facsimile unit.

An even further object of the present invention is to provide such a facsimile transmitting and receiving unit having a charge metering control mechanism, in which preallocated charge can be purchased in advance of unit utilization by, for example, placing a charge order by telephone to a designated charge purchase station. Such a facsimile system would be most suitable for rental applications providing discounted facsimile transmission charge rates.

An even further object of the present invention is to provide such a facsimile transmitting and receiving unit, in which selected information content of reproduced facsimile documents can be rendered concealed using one of a variety of facsimile information concealing technologies.

Another object of the present invention is to provide an accessory device for use in connection with a conventional facsimile machine, and which is capable of intelligently concealing selected information content of facsimile documents produced by the conventional facsimile machine.

Another object of the present invention is to provide such a facsimile accessory device, in which symbol recognition technology is employed to read symbols indicative of machine commands instructing the concealment of the confidential information bearing portions of facsimile documents produced from conventional facsimile machines.

These and other objects of the present invention will become apparent hereinafter and in the claims.

SUMMARY OF INVENTION

According to one of the broader aspects of the present invention, apparatus is provided for selectively transmitting land receiving facsimile information. In one illustrated embodiment, the apparatus is in the form of a facsimile system comprising a scanning means, a facsimile transmitting means, a facsimile receiving means, a facsimile recording means, a facsimile information concealing means, and a system control means.

The scanning means is provided for scanning a first document bearing information and producing a first facsimile data signal representative of this information. The facsimile transmitting means is provided for transmitting the first facsimile data signal to a selected receiving station, typically located remote from the apparatus. The facsimile receiving means, on the other hand, is provided for receiving a second facsimile data signal from a selected transmitting station, typically remote from the apparatus. The second facsimile data signal is representative of information contained in a second document disposed at the selected transmitting station. The facsimile information concealing means is provided for concealing at least a portion of the information contained in the facsimile of the second document. Operably associated with the above system capabilities, is the system control means which is provided for selectively controlling the operation of the scanning means, the facsimile transmitting means, the facsimile recording means, and the facsimile information concealing means.

In the preferred embodiment, the facsimile system is provided with a switching means operably associated with the system control means, and provided for selectively connecting the facsimile transmitting means with the selected receiving station, and also for selectively connecting the facsimile receiving means with the selected transmitting station by way of a data communication channel. The facsimile system also includes a command encoding means for selectively encoding the first facsimile data signal with at least one command code which is indicative of a predefined operation to be enabled or disabled at a selected receiving station. One such operation would be to conceal the received facsimile document.

In one illustrated embodiment, the command encoding means is in the form of an encoder which introduces a digital command code word into an appropriately formatted digitized facsimile data signal. When received at the selected receiving station, the encoded facsimile data signal can be decoded to determine the specific command operation intended at receiving station.

In another illustrated embodiment, the command encoding means can be in the form of symbol codes applied to a page of the confidential message to be transmitted. To decode such a command symbol appearing on recording material at the receiving station, a symbol recognizing means is provided. The symbol recognizing means is operatively associated with the control means so as to activate the operation of the facsimile information concealing means in response to recognition of at least one of the preselected symbols by the symbol recognizing means. The symbol recognizing means can be used to read bar-code symbols, or other character codes. Preprinted adhesive stickers bearing preselected bar code symbol codes can be applied to confidential messages to be delivered by facsimile transmission. In this way, the bar code symbols can encode the message to indicate that the message contains a predetermined number of pages and that the facsimile sheets are to be concealed to produce a secure, hard-copy document at the receiving station.

In an illustrated embodiment, the facsimile system also includes a facsimile transmission enabling means for enabling facsimile transmission on the basis of metered accumulation of charge incurred during facsimile transmission, and the amount of charge preallocated to the apparatus. In the illustrated embodiment, the facsimile transmission enabling means is in the form of a charge metering control means operatively associated with the system control means and adapted to receive and store charge data relating to preallocated (e.g. prepurchased) charge and transmission charge rates. This charge data can be transferred from a remotely located charge purchase station, over telecommunication lines, to the charge metering control means.

In one embodiment, the facsimile information concealing means is in the form of a device which dispenses and applies a layer of opaque material to the received facsimile document, which is subsequently sealed.

In a second embodiment, the facsimile message is recorded on a composite recording material, which conceals the confidential portion of the message by an opaque layer which can be removed by the addressee when physically delivered to him.

In a third embodiment, each facsimile message sheet is folded and sealed. When these folded and sealed pages are all collected together, the unconcealed facsimile cover sheet is fastened to the collected facsimile sheets.

In yet a fourth embodiment, each facsimile message page is collected, and then together inserted into an opaque enclosure which is sealed. Preferably, this opaque enclosure has an optically transparent window through which the facsimile cover sheet is made visible.

According to another aspect of the present invention, there is provided a facsimile accessory device for use with conventional facsimile apparatus including a facsimile output port and a recording means for producing an information bearing facsimile document for passage through the facsimile outlet port.

In general, the accessory device comprises an optically opaque housing, facsimile document transport means, facsimile information concealing means, and system control means. The housing has an accessory outlet port and an accessory outlet port. This accessory inlet port is adapted to be brought in operable association with the outlet port of the facsimile apparatus so that passage of a produced facsimile can be visually observed. The facsimile document transport means is disposed in the housing and is adapted for transporting the unconcealed facsimile document sheets through the housing, in a concealed manner, and outwardly from the accessory outlet port. The facsimile information concealing means is also disposed in the housing and is adapted for concealing at least a portion of the information contained on the facsimile document. In association with the above components, the control means is adapted for selectively controlling the operation of the facsimile document transport means and the information concealing means.

In the preferred embodiment, the accessory device of the present invention is also associated with a facsimile document sensing means, a velocity sensing means, and symbol recognizing means, all being selectively controllable by the control means. Facsimile document sensing means is disposed proximate the inlet port of the optically opaque housing and is capable of producing a facsimile document presence indication signal upon sensing the presence of the received (i.e., injected) facsimile document proximate the accessory inlet port. This signal is then provided to the control means, whereupon operation of the facsimile document transport means is initiated. The function of the velocity sensing means is to sense, for example, the instantaneous velocity of the injected facsimile document so that the control means can control the operation of the facsimile document transport means in accordance with the sensed velocity. In this way, jamming of injected facsimile documents can be prevented.

As in the facsimile system of the present invention, the symbol recognizing means permits reading of code symbols on the received facsimile document sheets, and to enable the control means to control the operation of the accessory device, on the basis of such symbol reading. Also, the facsimile information concealing means may be implemented using any one of the information concealing techniques described above.

The principles of the present invention can also be applied to facsimile recording units of various types, each interfaced with a computer system. In such envisioned facsimile recording units, selective facsimile message concealing capabilities can be provided.

BRIEF DESCRIPTION OF THE DRAWINGS

For a further understanding of the objects of the present invention, the detailed description of the illustrated embodiments is to be taken in connection with the following drawings, in which.

DETAILED DESCRIPTION OF THE ILLUSTRATED EMBODIMENTS

Figure 1:
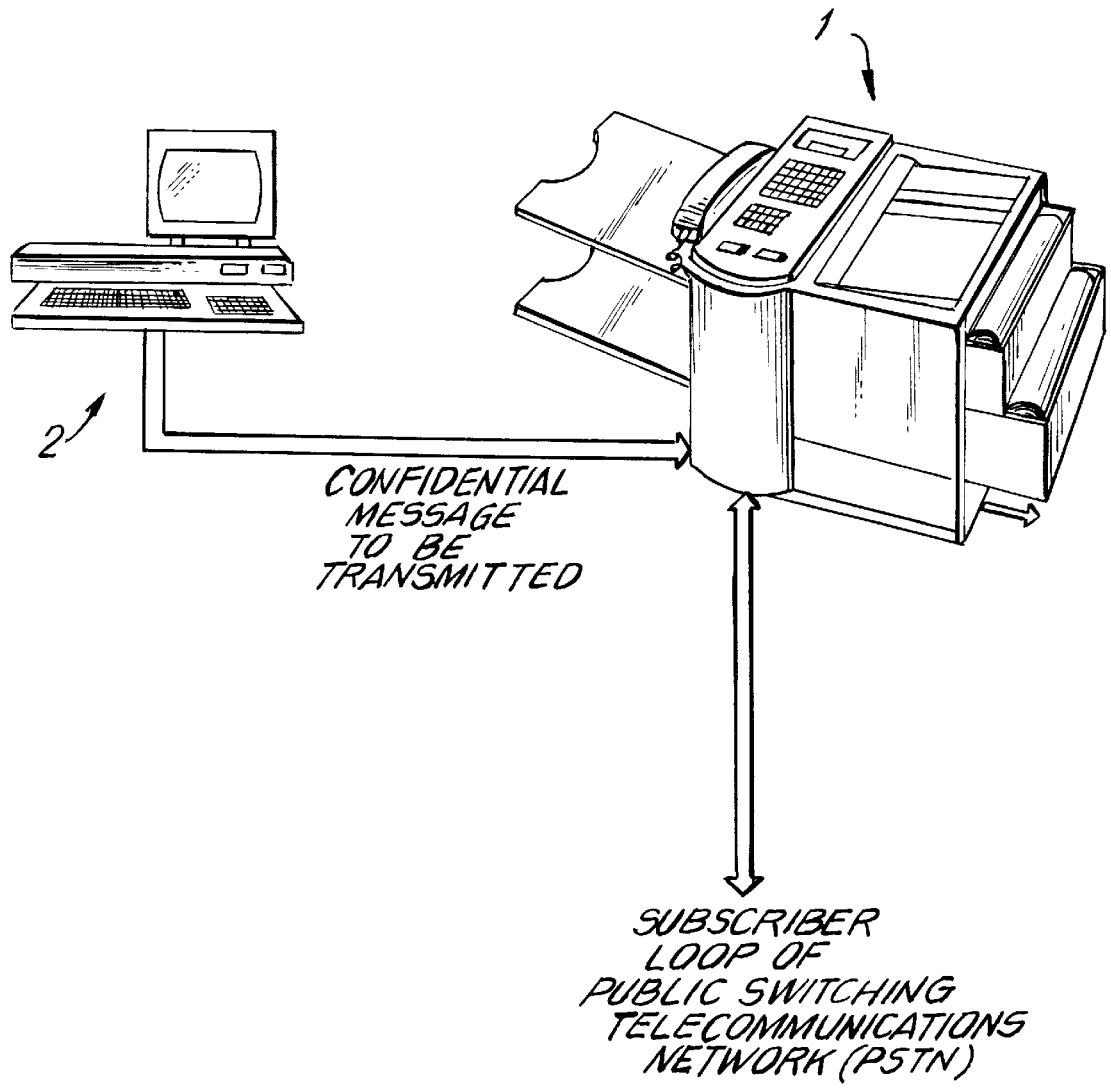
FIG. 1 is a schematic representation of a facsimile transmitting and receiving system of the present invention which is operably associated with a conventional word processing computer system and in data communication with a subscriber loop of a public switching telecommunication network.

Referring to FIG. 1, there is shown a facsimile transmitting and receiving system 1 of the present invention. As illustrated, a conventional computer system 2 with word processing software is shown interfaced with the facsimile system of the present invention through appropriate interface circuitry. The facsimile system on the other hand, is also shown operably connected to a subscriber loop of a public switching telecommunication network (PSTN), well known in the art.

Figure 2:
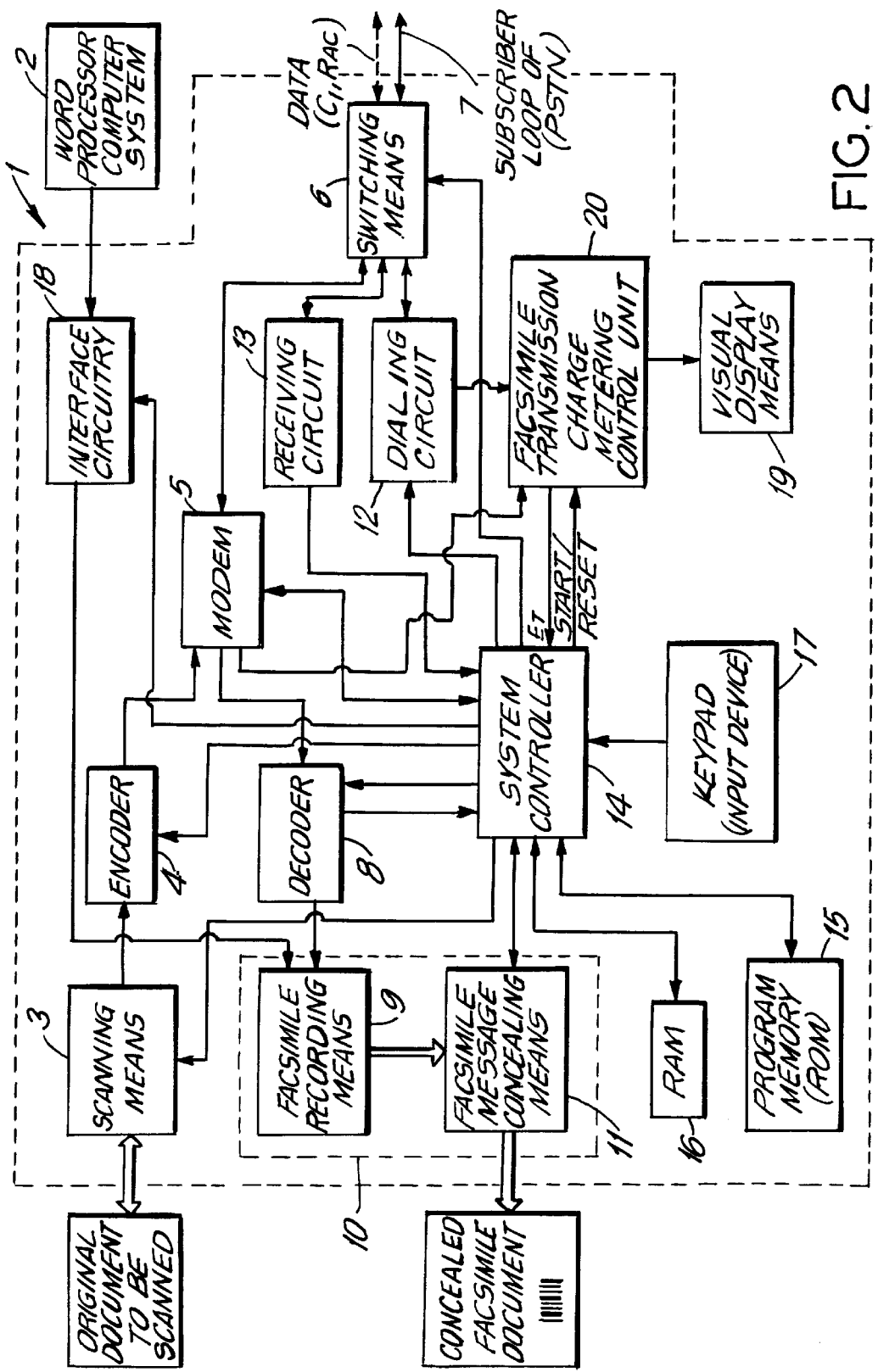
FIG. 2 is a block functional diagram of a first embodiment of the facsimile transmitting and receiving system illustrated in FIG. 1.

In FIG. 2, a block functional diagram of facsimile system 1 is shown. Facsimile system 1 comprises a scanner 3 for optically scanning an original document to be transmitted and generating a facsimile data signal in digital form. The facsimile data signal is encoded by an encoder 4 and modulated upon a carrier by a modem 5. As will be described in greater detail hereinafter, encoder 4 can include a suitable memory buffer, a data formatter, and a circuitry for encoding a preferably formatted facsimile data signal with at least one command code indicative of a predefined operation to be enabled or disabled at a facsimile receiving station. According to one technique, a digital command code indicative of an instruction to be executed at the facsimile receiving station, is introduced before the digital facsimile data signal to produce a composite encoded facsimile signal. The composite signal will have a prespecified format, known at each facsimile receiving station. Digital command code can be used to represent an instruction that the facsimile message is to be "concealed" at the receiving station, in accordance with the principles of the present invention as hereinafter described. Also, a second command code can be introduced after the first command code, but before the facsimile data signal, for the purpose of indicating to the receiving station the number (N) of pages contained in the transmitted message.

As shown, the output of modem 5 is fed to one input of a switching device 6, one output of which is coupled through a subscriber loop 7 to an end office of the public switched telecommunication network. Also as shown, modem 5 provides demodulation of a received signal transmitted through the subscriber loop. A decoder 8 is connected to modem 5 for decoding the demodulated received composite facsimile signal. Decoder 8 can include suitable memory buffer and circuitry for decoding the received composite facsimile data signals, so as to produce (i) any transmitted command codes for execution at the receiving station, and (ii) facsimile data for facsimile message reproduction. Such facsimile data is applied to a facsimile recording or printer 9. As will be described in greater detail hereinafter, a facsimile information concealing mechanism 10 is operably associated with facsimile recorder 9 so that, in response to the detection of an appropriate command code transmitted along with the facsimile data signal, confidential information is visibly concealed in one of a variety of ways by a facsimile information concealing unit 11.

A dialing circuit 12 is connected to a second input of switching device 6 for automatically performing a call establishment procedure to set up a facsimile call to a desired remote station, which preferably, although not necessarily, is equipped with a facsimile system of the type being described. A receiving circuit 13 is also connected to a third input of switching device 6 for automatically performing a call receive procedure in order to receive an incoming call from a remote calling station in the public switched telecommunication network.

As illustrated in FIG. 2, a system controller 14 is provided for controlling all the above-mentioned system components. As shown, control lines extend between system controller 14 and the above-mentioned system components 2 through 13, over these control lines, control signals are transmitted to control the operation of such components in a manner which will be described hereinafter. System controller 14, in the form of a programmable microprocessor, is further associated with a read-only memory (ROM) 15 for storing program instructions necessary to implement desired system communication and control functions and the like. Also, random-access memory (RAM) 16 is associated with system controller 14 for storing telephone numbers of specified call destinations, etc. A keyboard or keypad input device 17 is also connected to system controller 14 for entry of "command codes," system lock codes and telephone numbers of specified call destinations into RAM 16. In one illustrated embodiment of FIG. 2, a single key can be designated for sending facsimile message signals which have been encoded with command codes by encoder 4. In this way, composite facsimile signals can be transmitted, carrying along with the facsimile data signal, specific instructions to the receiving station that the facsimile message is to be secured by unit 11.

In typical office environments, an external computer system 2 is typically present, and usually is provided with word processing software for producing an original document for facsimile transmission. Thus, to permit digitized data corresponding to the original document to be transferred to facsimile recorder 9 of facsimile system 1, interface circuitry 18 is associated with system controller 14 and recorder 9.

In order to permit selective operation of the facsimile data transmitting and receiving portions of the facsimile system, a facsimile-transmission/reception charge metering control unit 20 is provided. In the embodiment illustrated in FIGS. 2 and 5, in particular, charge metering control means 20 is associated with system controller 14, modem 5 and dialing circuit 12. In this embodiment, the function of control unit 20 is to store charge data and enable system controller 14 to operate transmitting components 3, 4, 5, 6 and 12 only under specific conditions. However, in other embodiments, the function of control unit 20 can be extended to include the controlled operation of the receiving components 5, 6, 8, 9 and 13 and facsimile message concealing unit 11 under specific conditions. Hereinbelow, conditions for transmission control operations will be defined in terms of charge data parameters representable within charge metering control unit 20 of an illustrated embodiment of the present invention.

Figure 3:
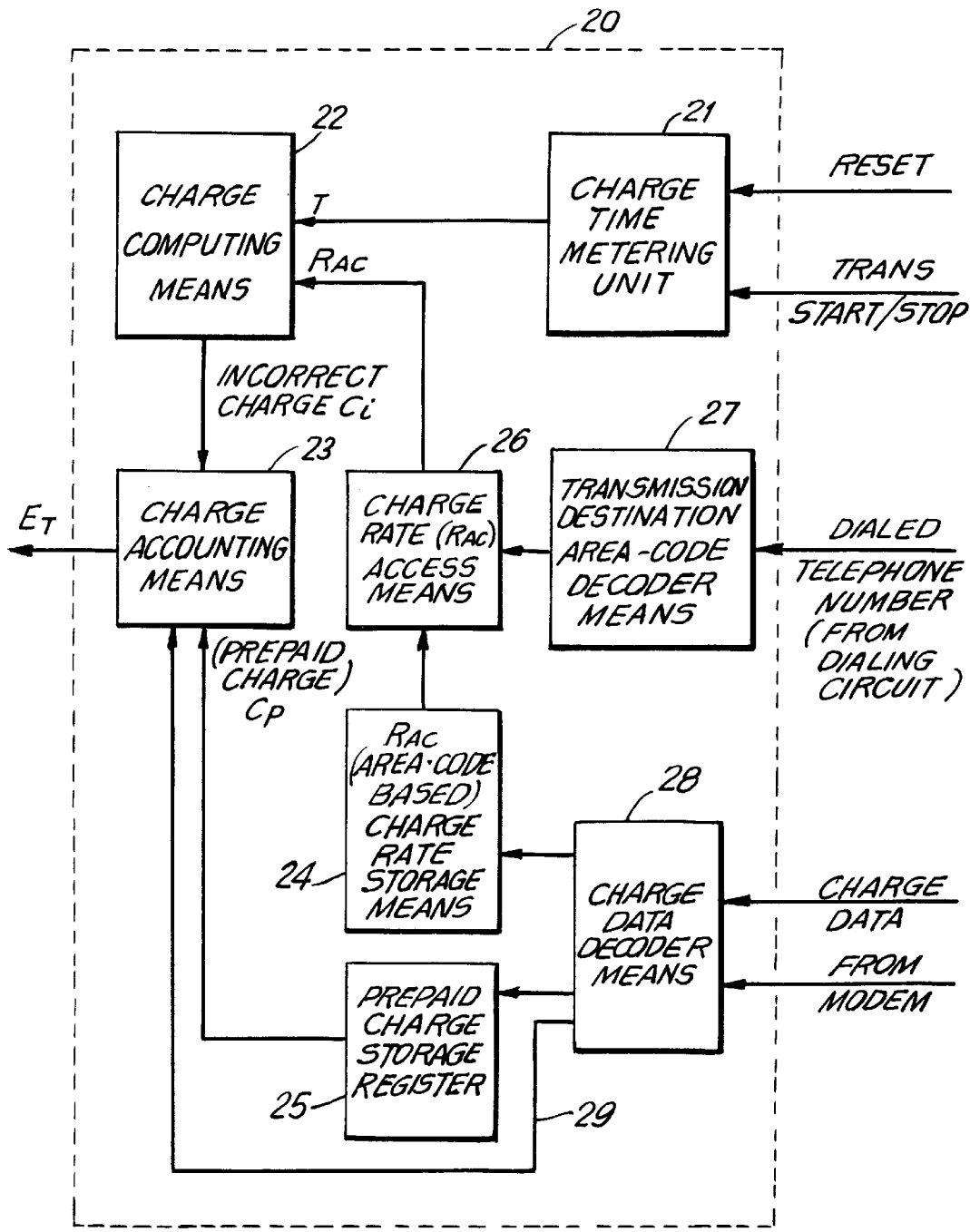
FIG. 3 is a block functional diagram of the means for controlling the metering of facsimile transmission charge in the facsimile system illustrated in FIG. 2.

As illustrated in FIG. 3, charge metering control unit 20 comprises a number of subunits, namely, charge time metering subunit 21, charge computing subunit 22, charge accounting subunit 23, charge rate storage subunit 24, preallocated (e.g. prepaid) charge storage subunit 25, charge rate access subunit 26, area-code decoding subunit 27, and charge data decoding subunit 28. Charge time metering subunit 21 is essentially a timer which has a reset input and start/stop input; the output of the timer is a digital code representative of the time interval lapsing between a start pulse and stop pulse delivered to the start/stop inputs from system controller 14. charge computing subunit 22 is essentially a computing device which receives as inputs, (i) the time interval T measured by charge time metering subunit 2 and (ii) charge rate $R_{AC}$ accessed by access subunit 26. The output of charge computing subunit 22 is the computed charge $C_i$, incurred during the transmission of a facsimile document to a particular area and/or country, requiring transmission time T seconds. Notably, since transmission charge rates will typically depend on the calling destination (i.e., telephone number), area-code (and/or country code) decoding subunit 27 is used to determine the area-code of the telephone number being dialed, and to cause charge rate access subunit 26 to access the corresponding area-code dependent charge rate $R_{AC}$ from charge rate storage subunit 24, and provide it to charge computing subunit 22, all under the control of system controller 14.

Preferably, charge rate storage subunit 24 is an erasable programmable memory device (e.g. EPROM), which contains different charge rates for different types of calls, e.g., local, long distance and international phone calls. Also, since these charge rates will change from time to time, the contents of corresponding memory locations can be updated by revised charge rate data provided from a remotely situated charge purchase station accessible through the public switched telecommunication system. Similarly, preallocated charge data in charge storage unit 25, can also be updated or changed by charge data provided from such a remote charge station. For security purposes, the requested charge data can be encoded at the remote charge station, and then transmitted to switching device 6, demodulated at modem 5, and decoded by decoding subunit 28, as shown. The outputs of the decoding subunit 28, in turn, are provided to the charge rate and charge storage subunits 24 and 25, respectively.

In order to determine if a facsimile transmission enable signal $E_T$ should be generated by charge accounting subunit 23 and provided to system controller 14, the charge accounting subunit will perform several basic accounting functions. First, charge accounting subunit 23 continuously accumulates a running balance of charges incurred during present as well as previous facsimile transmissions. Typically, the accounting period would begin as of the time $T_p=0$ prepaid charge $C_p$ was registered in preallocated charge storage subunit 25. The beginning of such an accounting period can be established by an account commencement period signal 29 provided to charge accounting subunit. The account commencement signal 29 can be derived within subunit 28 from a signal transmitted by the remote charge purchaser station as shown in FIG. 3. Secondly, charge accounting subunit 23 will continuously subtract charge $C_i$ incurred over the predefined accounting period, from the running charge balance. Essentially, the amount of charge available $C_A$ in the unit at any time $t=T_i$, equals $C_p(T_p)$ minus the sum of subcharge $C_i(T_i)$ incurred over the transmitting time interval. With such computational capacities available, a number of possible transmission enabling conditions can be preprogrammed in charge accounting subunit 23. For example, one such condition might be as follows. So long as the value of the relationship stated above is greater than zero, the charge accounting unit 23 will generate a transmission enable signal $E_T=1$. If, however, the value of the relationship is less than or equal to zero, transmission enable signal $E_T=0$ is provided to system controller to disable facsimile transmission.

Preferably, charge metering control unit 40 and system controller 14 are also suitably programmed and free to exchange charge data information on a real-time basis so as to provide a variety of desired functions. For example, when the available charge $C_A$ drops to a predetermined value, an alarm indication signal is generated, from which an audible or visual indication could be produced by an alarm device, alerting the system operator of a depleted transmission charge condition. Also, when charge is depleted during a facsimile transmission, the system controller 14 permits completion of the commenced transmission, and charge accounting subunit 23 accounts for the charge deficit incurred by the system user. In addition, when desired, information stored in charge accounting subunit 23 can be visually displayed upon visual display device 19 to provide the system user with desired or required charge status information.

Figure 4:
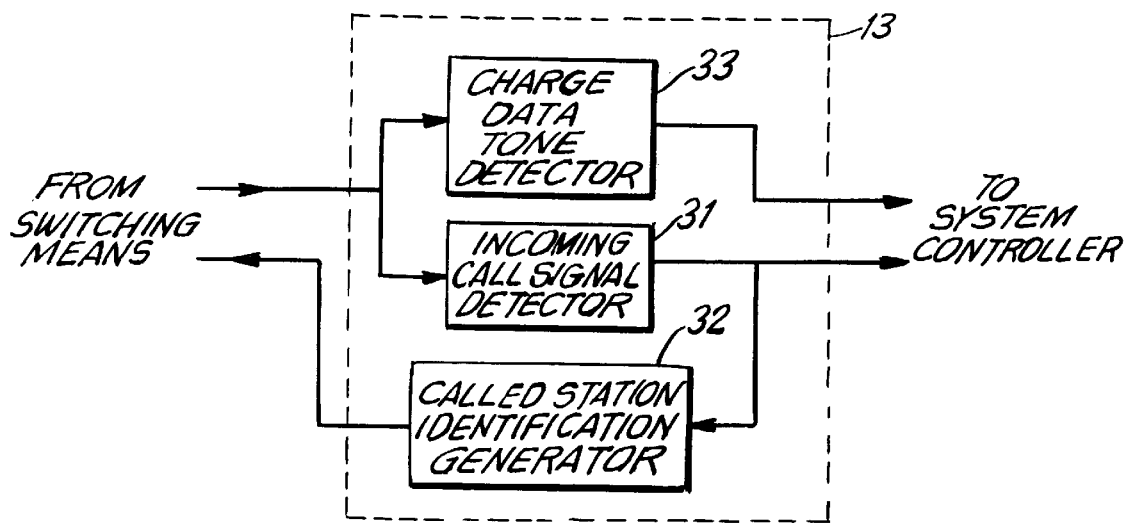
FIG. 4 is a block functional diagram of the receiving circuit of the facsimile system illustrated in FIG. 2.

As will be described in greater detail hereinafter, FIG. 4 illustrates two of the principal components of receiving circuit 13 of facsimile system 1. In particular, receiving circuit 13 comprises incoming call signal detector 31 and a charge data tone detector 32, which are operably associated as shown. To appreciate the function of these detectors, an understanding of how charge data is acquired and updated in an illustrated embodiment, is in order.

Typically, when preallocated charge data is to be purchased, and subsequently transmitted to charge metering control unit 20 from a remote charge purchase station, a charge order would first be placed. This would typically be accomplished by the system operator placing a telephone order to the charge purchase station. Preferably, the charge purchase would involve a consumer transaction between a person at the charge purchase station and the system operator/customer at facsimile system 1. After the charge purchase has been placed, a charge data generating computer (not shown) at the charge purchase station enters a first phase of a charge call establishment procedure, in which the charge data generating computer transmits, through the public switched telephone network, an incoming call signal which incoming call signal detector 31 detects. System controller 14 then determines whether facsimile system 1 is ready to receive a call. If the line is idle, facsimile system 1 will receive ringing signals to close the subscriber loop. Thereafter, system controller 14 will then direct called station identification (CSI) generator 32 to generate and transmit to the charge purchase station, a digital CSI signal identifying the called station and confirming that the called station is ready to receive facsimile data.

At this time, system controller 14 continues to direct switching unit 6 to connect receiving circuit 13 to the subscriber loop. The charge data generating computer then transmits a prespecified signal tone over the subscriber loop indicating that charge data, rather than facsimile data, is going to be transmitted. Upon detection of the tone within a predetermined time period $T_{CD}$, charge data tone detector 33 will produce a charge data enabling signal to system controller 14. In response, to the detection of the prespecified tone at the receiving unit system controller 14 directs switching unit 6 to effect several switching operations. Firstly, switching unit 6 connects subscriber loop input to modem 5 so that incoming signals over subscriber loop can be demodulated to produce encoded charge data. Secondly, switching unit 6 connects the output of the modem to decoding subunit 28 of the charge metering unit. Otherwise, however, no tone is detected by charge data tone detector 33 within time $T_{CD}$, then system controller 14 directs controls switching unit 6 to provide subscriber loop input signals to modem 5 for demodulation and production of facsimile data signals, and also to connect the output of the modem to decoder 8 for appropriate decoding.

Figure 5A:
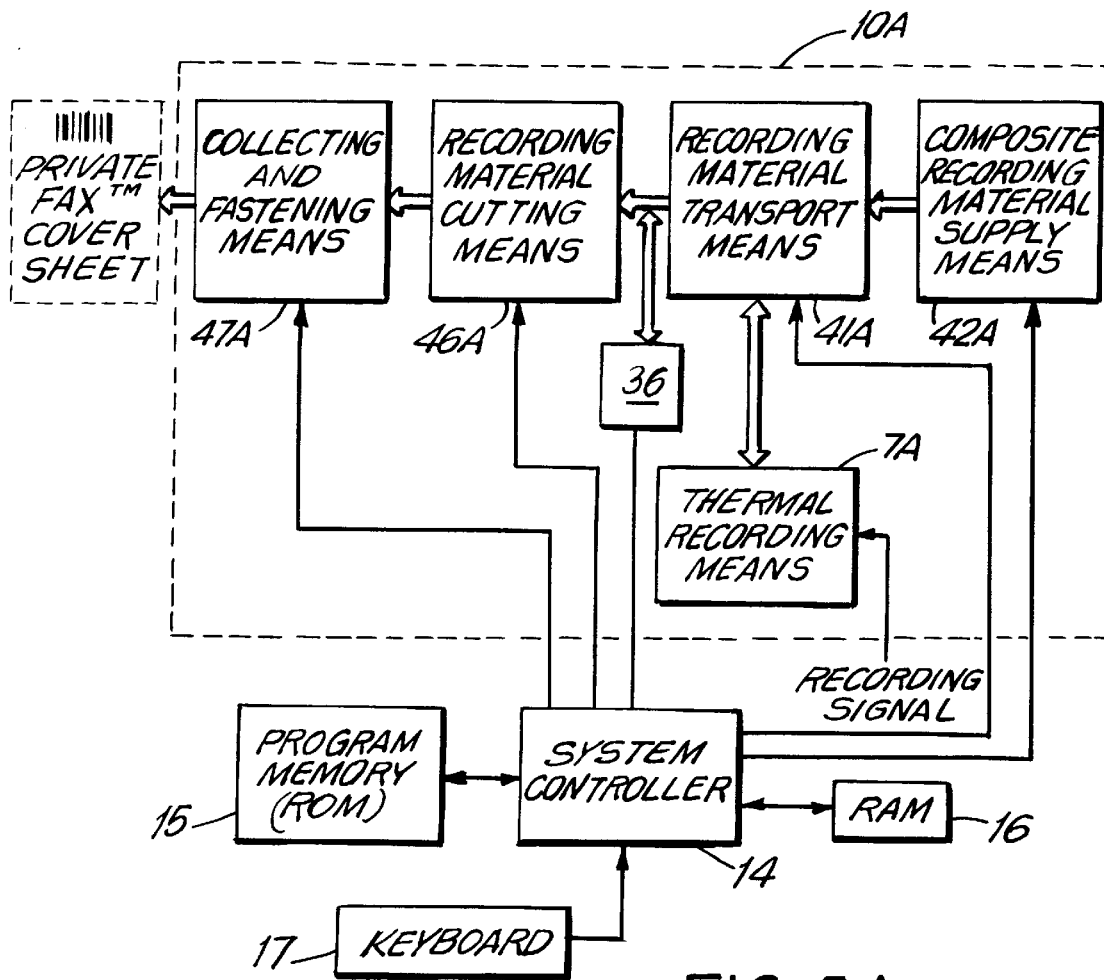
FIG. 5A is a block diagram of the third embodiment of the facsimile system of the present invention.
Figure 5:
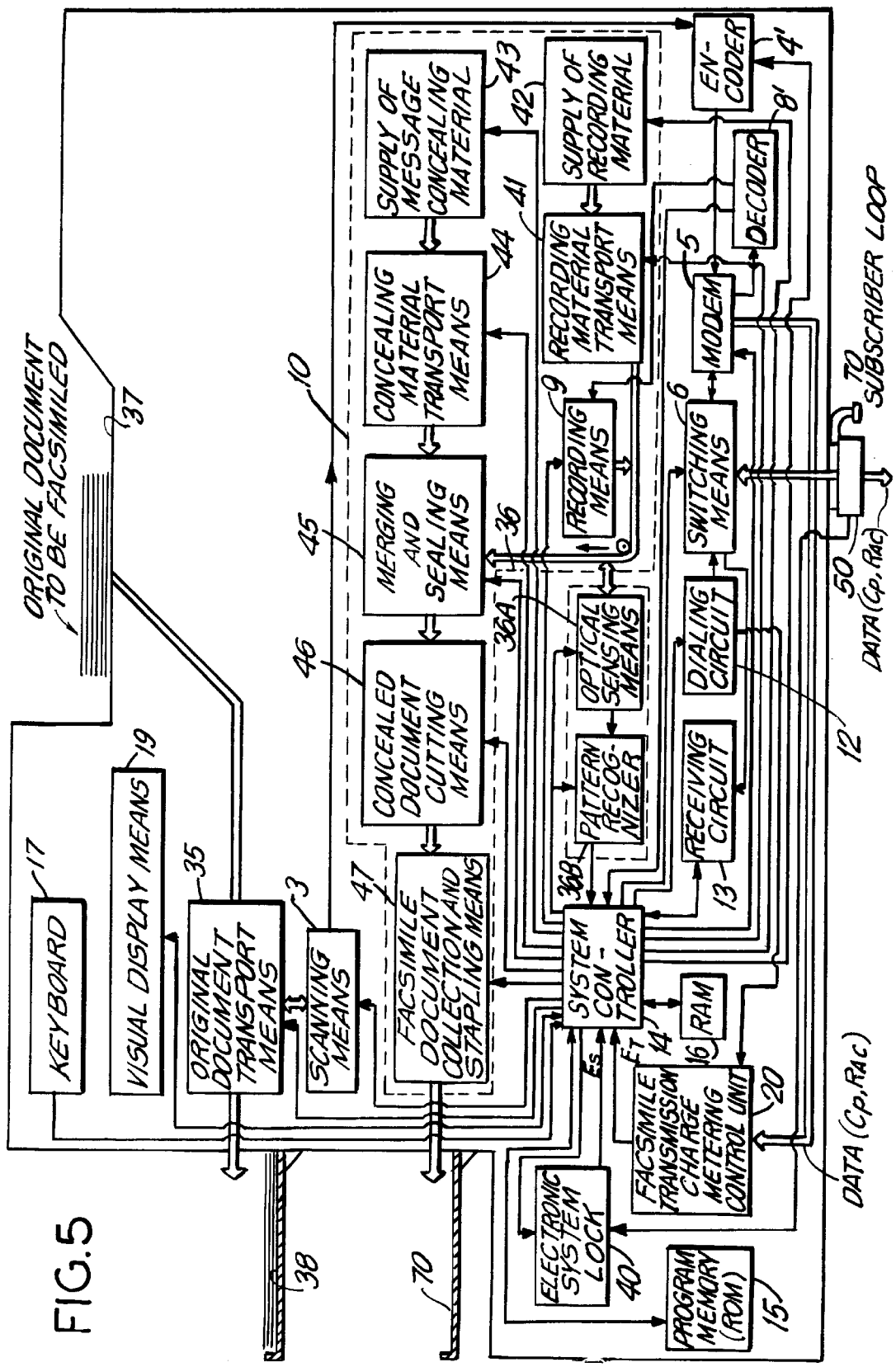
FIG. 5 is a block functional diagram of a second embodiment of the facsimile system of the present invention.

Referring now to FIG. 5, the second embodiment of the facsimile system is schematically illustrated, with system components shown in FIG. 2 being indicated with similar reference numerals in FIG. 5. Notably, however, in this particular embodiment, encoder 4' and decoder 8' are preferably modified from encoder 4 and decoder 8, so that these system components are not provided with the capability of encoding and decoding "command code" data, respectively, as discussed in connection with the first embodiment.

In addition to the system components illustrated in FIG. 2, system 1 of FIG. 5 further includes an original document transport mechanism 35, a symbol recognition unit 36 provided by an optical sensing subunit 36A and pattern recognizing subunit 36B, and a selectively-concealing facsimile recording subsystem generally indicated by dotted lines and reference numeral 10. The function of original document transport mechanism 35 is to transport original documents from loading bin 37 through the scan field of scanner 3, and then deposit the scanned original documents in a collection bin 38, as illustrated. The function of symbol recognition unit 36 is to determine whether or not a reproduced (i.e. received) facsimile document bears a symbol code (i.e., command code) indicative of, for example, the presence of confidential facsimile information, and the number of pages in the transmitted document. If the facsimile document does contain confidential information, then symbol recognition unit 36 will recognize this and generate a signal which, for example, informs system controller 14 of this fact so that the recorded facsimile message can be concealed or otherwise secured by the selectively-concealing facsimile recording subsystem 10. As will be described hereinafter, other illustrated embodiments show other techniques available for concealing the confidential information of received facsimile documents.

The term "symbol", as used herein, is intended to cover indicia composed of different portions having different light-reflective properties at the wave-length of the light source, e.g. a laser, being utilized in subunit 36A. The indicia may be black and white industrial symbols, e.g. Code 39, Codabar, Interleaved 2 of 5, etc., and also the omnipresent UPC bar code symbol. The indicia may also be any alphabetic and/or numeric characters. The term "symbol" is also intended to cover indicia located in a background field, wherein the indicia, or at least a portion thereof, have a different light-reflective property than that for the background field.

In addition to the above described components, an electronic system lock 40 is also associated with the facsimile system. Electronic system lock 40 is provided to ensure that the telecommunication hook-up between the facsimile system and the leased subscriber loop, has not been tampered with after an inter-connection has been established by an authorized technician. All of these system components are operably associated with system controller 14 through respective control lines.

As illustrated in FIG. 5, facsimile recording subsystem 10 of the second embodiment comprises a number of subcomponents, namely: recording unit 9, a recording material transport mechanism 41, a recording material supply unit 42, concealing material supply unit 43, concealing material transport mechanism 44, material layer merging and sealing unit 45, concealed facsimile document cutting unit 46 and facsimile document collection and stapling unit 47. Each of these subunits are under the direct control of the system controller and are activated in accordance with a predetermined program carried out by the system controller, in a manner which will be described hereinafter.

In general, recording unit 9 can be virtually any type recorder, utilizing, for example, thermal, laser-electrostatic, electro-sensitive, or thermal transfer printing processes, all well known in the art. In the embodiment shown in FIG. 5, a thermal-printing type recorder is presumed for illustration purposes only. Accordingly, supply unit 42 provides thermal paper to transport mechanism 41, both under the control of system controller 14. The thermal paper transport mechanism 41 transports supplied thermal paper through thermal recording unit 9, and provides the recorded-upon thermal paper layer to the first input port of layer merging and sealing unit 45. Provided to the second input port of layer merging and sealing unit 45, is a layer of information concealing material provided from supply unit 43 and transported by transport unit 44, as shown. The information concealing material is essentially opaque to visible radiation, and the thermal paper layer can be of any suitable type known in the art. Layer merging and sealing unit 45, in essence, brings or merges the two layers together so that the top most concealing layer is disposed over the confidential graphical and other information reproduced in the thermally recorded layer. Prior to the completion of this merging operation, thin strips of sealing agent (i.e. adhesive) are applied between these overlapping layers, preferably at perimetrical areas thereof, in order to effectuate a secure seal between the merged layers. Alternatively, thin layers of curable adhesive can be preapplied to the outer opposite edges of the concealing layer, with one or more pairs of strips of non-curable tack-type releasable adhesive applied longitudinally along the central portion of the concealing layer. Thereafter, the layers can be compressed together, and if necessary, the curable adhesive cured by heat or other radiation, to produce a composite facsimile document layer which is subsequently cut to a desired length by cutting unit 46. Composite sheets of concealed facsimile documents are then collected in the collection compartment of unit 47, and subsequently stapled together under the control of system controller 14.

In certain business applications, it may be desired that a leased telephone line for use with a leased facsimile system of the present invention, be interconnected by an authorized serviceman and not be subsequently disturbed without authorization of the lessor of the facsimile system. In order to ensure this desired condition, the facsimile system illustrated in FIG. 5 is provided with electronic system lock 40 and specially adapted telecommunication jack 50 illustrated in FIGS. 5 and 6.

Figure 6:
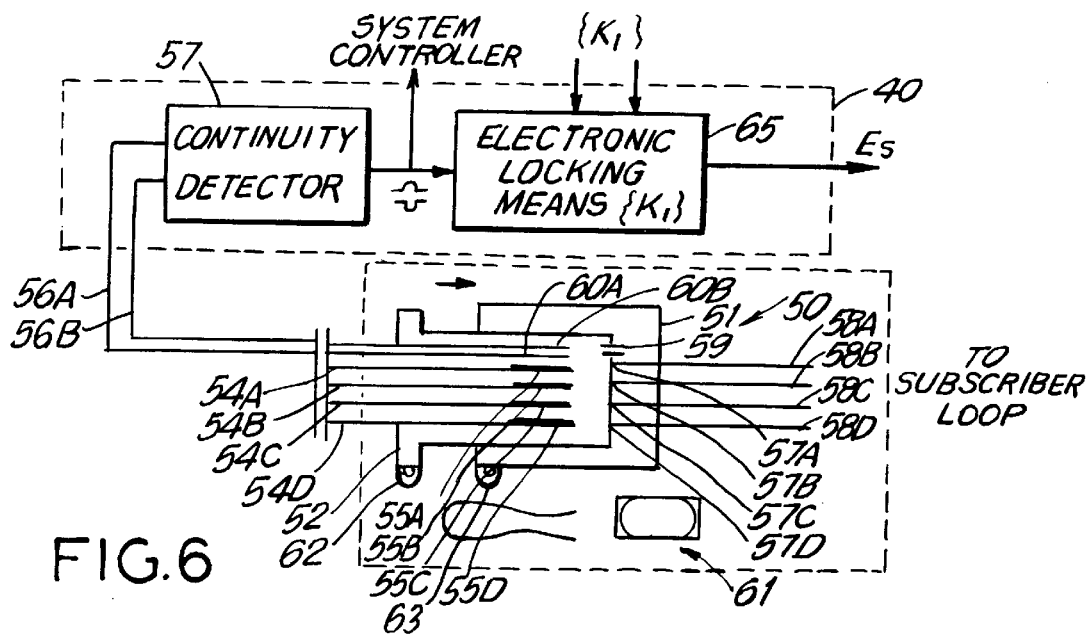
FIG. 6 is a schematic representation of the electronic system lock of the facsimile system shown in FIG. 5.

As shown in FIG. 6, telecommunication jack 50 comprises a socket portion 51 and a matched plug portion 52 adapted to insert within the socket portion. The socket portion is preferably formed as an integral part of the facsimile system housing 53. Extending from switching unit 6 are conductor lines 54A, 54B, 54C and 54D which pass through plug 52 and terminate in conductive pins 55A, 55B, 55C and 55D, respectively. Also, a pair of conductive wires 56A, 56B extending from continuity Idetector 57 of electronic system lock unit 40, also pass through plug portion 52, and terminate in spaced apart conductive elements 60A, 60B recessed within the plug portion, as shown. In the base of the socket portion, conductive plugs 57A, 57B, 57C and 57D are formed and are electrically connected to conductive leads 58A, 58B, 58C and 58D, respectively, which form electrical cord leading towards the subscriber loop of the public switching telecommunication network. Also formed in the base of the socket portion is a conductive pin 59 which is adapted to insert within spaced apart conductive elements 60A and 60B and short the same, as pins 55A, 55B, 55C and 55D establish electrical contrast with corresponding plugs 57A, 57B, 57C and 57D when plug portion 52 is inserted within socket portion. In order to mechanically seal jack 50 with a security seal 61, both plug and socket portions 52 and 51 are provided with integrally formed tabs 62, 63 having respective bores for passing the security seal therethrough in a manner known in the security seal art.

As illustrated in FIG. 6, electronic system lock unit 40 comprises continuity detector 57 and electronic lock subunit 65. Inputs to continuity detector 57 are provided by electrically conductive leads 56A and 56B from plug portion 52, described hereinabove. The output of continuity detector 57 is provided to system controller 14, whereas the inputs of subunit 65 are provided with a setting signal and a locking code $\{K_2\}$ from system controller 14. The function of continuity detector 57 is to produce a continuity detection signal $S_c=0$. The function of electronic lock subunit 65 is to produce a system enable signal (i.e. $E_S=1$) enabling facsimile transmission and reception. Such enable signal $E_S=1$ will be produced only if the keyed-in locking code $\{K_1\}$ produced by system controller 14 in response to key entry operations, matches prestored locking code $\{K_2\}$ stored in, for example, ROM within electronic lock subunit 65. Otherwise, the output of electronic lock subunit 65 is set to state $E_S=0$ which disables the facsimile system 1 from both facsimile transmission and reception. This electronic system lock can be "set" by performing the setting process illustrated by the flow chart of FIG. 6.

Figure 6A:
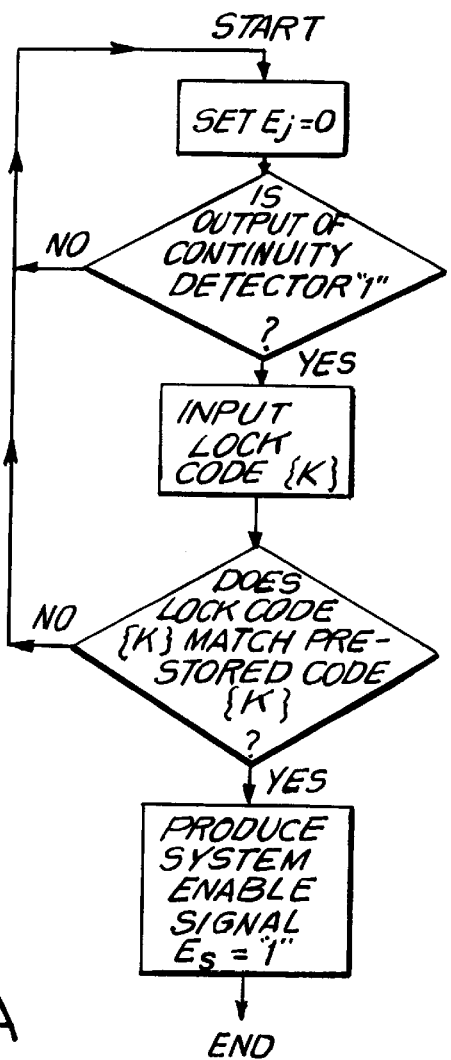
FIG. 6A is a system flow chart illustrating the process involved in setting the electronic system lock of FIG. 5A.

As illustrated in FIG. 6A, the lock setting process commences by system controller 14 initially setting the output of electronic lock subunit to state $E_S=0$. Then, the system controller determines whether the output of continuity detector 57 is a logical "1", indicating physical interconnection between plug portion 52 and socket portion 51. If there is such continuity, system controller 14 enables electronic lock subunit 65 to perform a lock-code matching process. Typically, this process involves the service technician performing the initial system hook-up, to input a confidential lock code $\{K_1\}$ using keyboard 17. Then, electronic lock subunit 65 compares lock code $\{K_1\}$ with prestored lock code $\{K_2\}$. If they match, then electronic lock subunit 65 produces a system enable signal $E_S=1$ which remains a constant value until the output of continuity detector 57, provided to lock subunit 65, changes its state from a continuity related value (e.g., "1") to a discontinuity related value (e.g. "0").

As illustrated in FIG. 5, the outputs of system lock unit 40 and charge metering control unit 20, $E_S$ and $E_T$, respectively, are provided to two separate control inputs of system controller 14. In the preferred embodiment, system controller 14 is programmed to assure that neither the receiving or transmitting capability of the facsimile system is enabled unless electronic system lock unit 40 provides an appropriate enable signal, e.g. $E_S$ equals logical "1". Also, system controller 14 may be programmed to provide disablement of only the facsimile transmitting capability of the system when, for example, charge metering control unit 20 provides an appropriate transmission disable signal, e.g., $E_T$ equals logical "0". With both of these respective subunits, it is advantageously possible to preprogram operational limitations into the facsimile system based upon, for example, detection of tampered telecommunication-lines/facsimile-system interconnection and inadequate charge reserves for facsimile transmission.

Having described the structure and function of the components of an embodiment of a facsimile system according to the present invention, it is appropriate at this juncture to describe in detail its system operation.

According to the method of the present invention, a code symbol is provided to the facsimile message prior to transmission. As described hereinabove, this can be achieved by combining command codes along with digitized facsimile data, to produce composite facsimile signals. Also this can be achieved by providing graphically demonstrable code symbols to the facsimile message to be transmitted. For purposes of illustration only, the latter case shall be considered below, in which bar code symbols are used. Preferably, prerecorded adhesive stickers bearing preselected bar code symbol codes, are applied to the confidential message to be transmitted to the receiving station. These bar code symbols can be selected so as to encode the message to indicate that the message contains a predetermined number of pages and that the facsimile sheets are to be concealed to produce a secure, hard-copy document at the receiving station.

Figure 7:
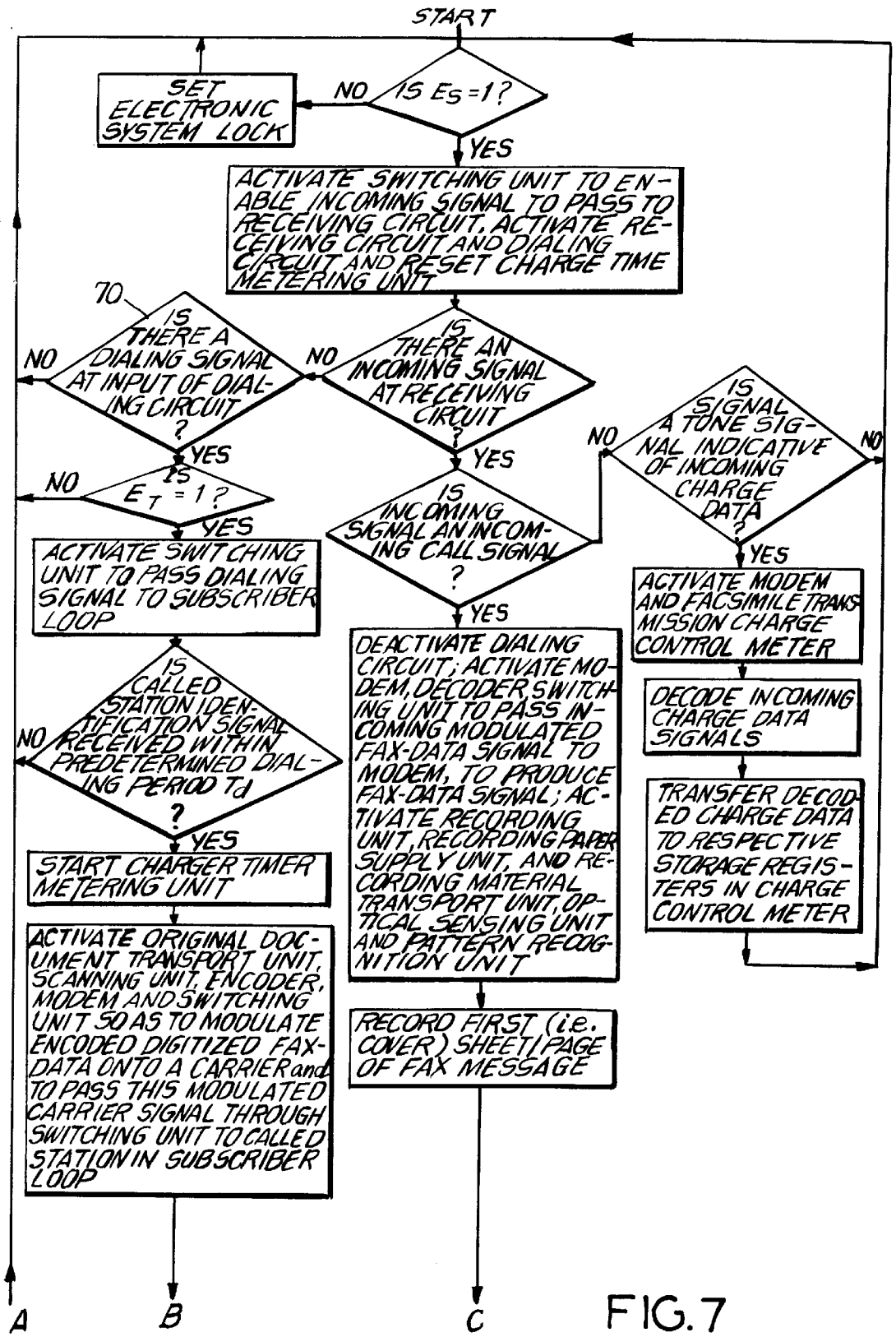
FIG. 7 is a system flow chart illustrating the various modes of possible operation of the facsimile system shown in FIG. 5.
Figure 7:
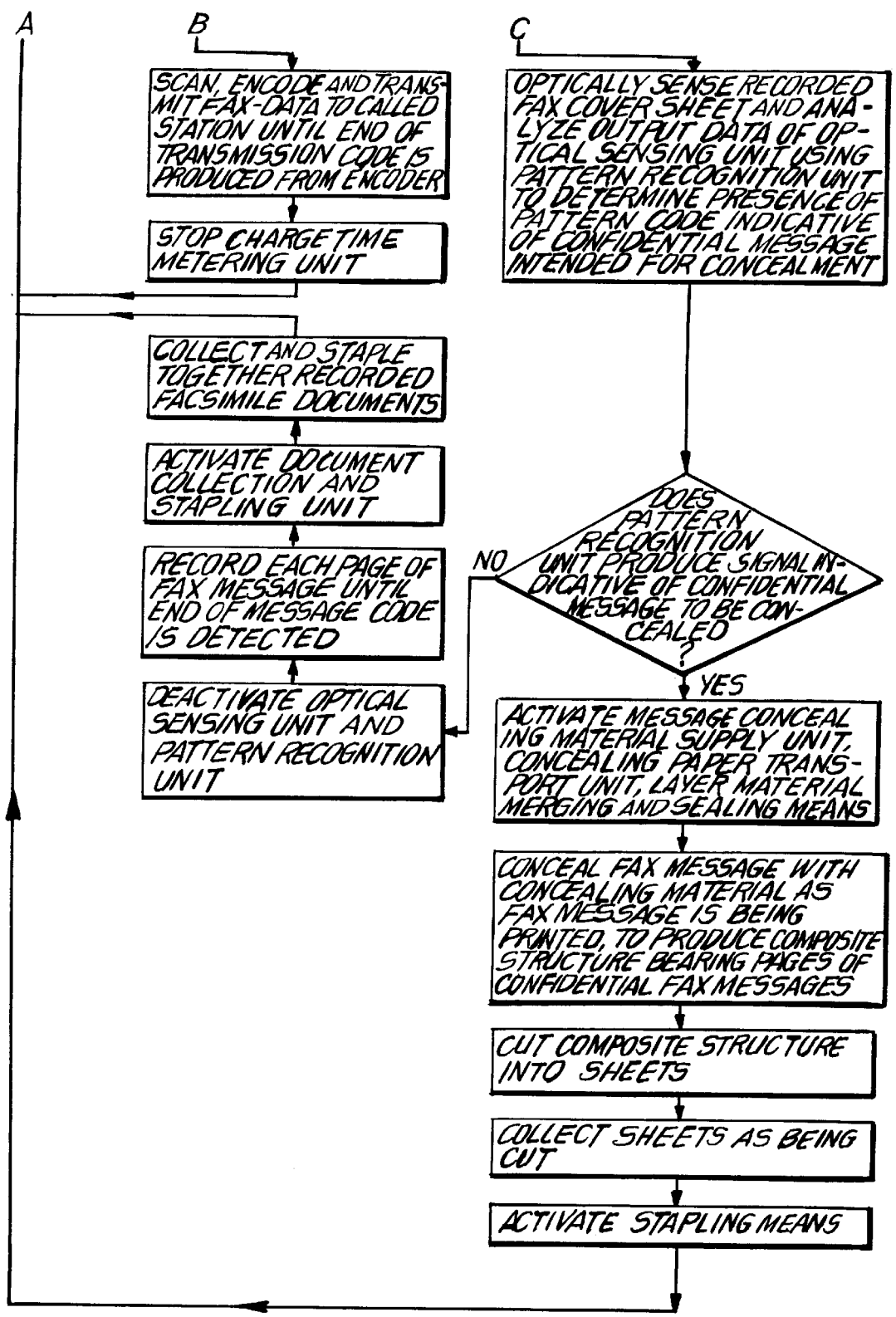

Referring now to FIGS. 5 and 7, the system operation of the second embodiment of the present invention will be described. As illustrated in the system flow chart of FIG. 7, system controller 14, in its initial or start up state of operation, first determines whether electronic system lock 40 is enabled. This is achieved by determining if the condition "$E_S=1$?" is true. If it is not, then electronic lock 40 must be set before the system will further operate. If condition $E_S=1$ is true, then system controller 14 activates receiving circuit 13. Simultaneously, system controller 14 directs switching unit 6 to pass all incoming signals to receiving circuit 13. Then whether or not the system receives an incoming signal at receiving circuit 13, the system may enter one of two possible modes of operation. Specifically, if an incoming signal is detected at receiving unit 13, then the facsimile system may either enter a facsimile receive mode or charge data receive mode, depending on the nature of the incoming signal.

As illustrated, if the incoming signal is a call signal indicating that a facsimile data transmission signal is to follow, a number of the system components are activated or called into controlled operation. Namely, after a call establishment protocol is completed, system controller 14 deactivates dialing circuit 12, and activates switching unit 6 and modem 5 so as to transfer the incoming modulated facsimile-data signal to modem 5, to produce a facsimile-data signal. Also, system controller 14 activates facsimile recording unit 9, recording material transport unit 41, recording material support unit 42, optical sensing subunit 36A and pattern recognition subunit 36B. Thereafter, system controller 14 orchestrates these units as hereinbefore described, to record the first (e.g. cover) sheet or page of the facsimile document. As the facsimile cover sheet is being reproduced, optical sensing unit 36A optically senses information recorded on the cover sheet surface and produces a stream of output scan data. Therewhile, pattern recognition subunit 36B analyzes this stream of scan data and determines whether or not a prespecified pattern code (e.g. bar code) is present, indicating that the subsequent pages of the transmission contains confidential information which is to be concealed or otherwise secured.

If the pattern recognition subunit 36B produces a signal indicative of a confidential message to be concealed, then system controller 14 activates concealing material supply unit 43, concealing material transport unit 44, and layer merging and sealing unit 45. Then, as facsimile document pages are being printed, system controller 14 orchestrates the above-identified units, and starting at the second page of the facsimile document, merging and sealing unit 45 applies a layer of opaque concealing material over the facsimile information, to produce a composite structure as described hereinabove. As this message concealing process is carried out, system controller 14 also directs cutting unit 46 and facsimile document collection and stapling unit 47, to cut, collect and staple together pages of the facsimile document, respectively. Thereafter the concealed facsimile document is ejected into a facsimile document collection bin 70 for pickup and delivery to its addressee in a confidential manner. At this stage of operation, system controller 14 returns the system to its initial or "start" mode of operation, as shown in FIG. 7.

Alternatively, as shown in FIG. 7, if pattern recognition subunit 65B does not produce a signal indicating that the pages of the following facsimile document are not to be concealed, then system controller 14 deactivates optical sensing and pattern recognition subunits 36A and 36B, and orchestrates units 41 through 47 so as to record, conceal, collect and staple together the sheets of the facsimile document.

In the event that no incoming signal is received at receiving circuit 13, then as illustrated at block 70, it is possible that a dialing signal, initiated by the system user, might be present at the input of dialing circuit 12. If such a dialing signal is present, then system controller 14 determines whether or not there is adequate charge available for facsimile transmission. This can be ascertained by determining if the condition "$E_T=1$" holds true. If this condition is not true, then the facsimile system returns to the initial start state, as shown, and can be recharged by the charge data transfer procedure described hereinabove. If condition $E_T=1$ is true, then system controller 14 first resets charge time metering unit 21. System controller 14 then activates switching unit 6 to pass the dialing signal at dialing circuit 12 to the subscriber loop, where the end office attempts to connect with the called station. If a CSI signal and is received within a predetermined dialing time $T_d$, closing the subscriber loop, then system controller 14 activates original document transport unit 35, scanner unit 3, encoder 4', modem 5 and switching unit 6. System controller 14 then orchestrates the operation of these components so as to scan the original document to produce a digitized facsimile data signal from encoder 4'. This data signal is then modulated onto a carrier signal from modem 5, and transmitted through switching unit 6 to the called station in subscriber loop. When scanning, encoding and data transmission is completed, system controller 14 stops charge time metering unit 21, and directs facsimile system to return to the initial (i.e. start) state of operation.

Referring to FIGS. 5 and 5A, the structure, and function of the third embodiment of facsimile system of the present invention will be described. In FIG. 5A, an alternative embodiment of the facsimile recording and concealing subsystem 10 is shown. For purposes of simplicity subsystem 10A has been shown in FIG. 5A as being associated with only system components 14 through 17. However, this subsystem would preferably be associated with system components illustrated in FIG. 5.

Subsystem 10A generally comprises thermal recording unit 9A for thermally printing upon composite recording material provided by supply unit 42A and transported through recording unit 9A by transport unit 41A. Subsystem 10A also includes a cutting unit 46A for cutting composite material into desired length sheets, and a facsimile document collection and stapling unit 47A is provided for collecting cut sheets of composite material and stapling them together. As in the first embodiment, all of the subcomponents of this system are under the direct control of system controller. Examples of thermally recordable composite material suitable for this facsimile recording subsystem, can be found in pending U.S. patent application Ser. No. 07/612,325 entitled "Flexible Composite Recording Material and Method of Securely Delivering Hard Copies of Confidential Messages Using the Same," filed on Nov. 13, 1990. This pending Application is incorporated herein by reference.

Figure 7A:
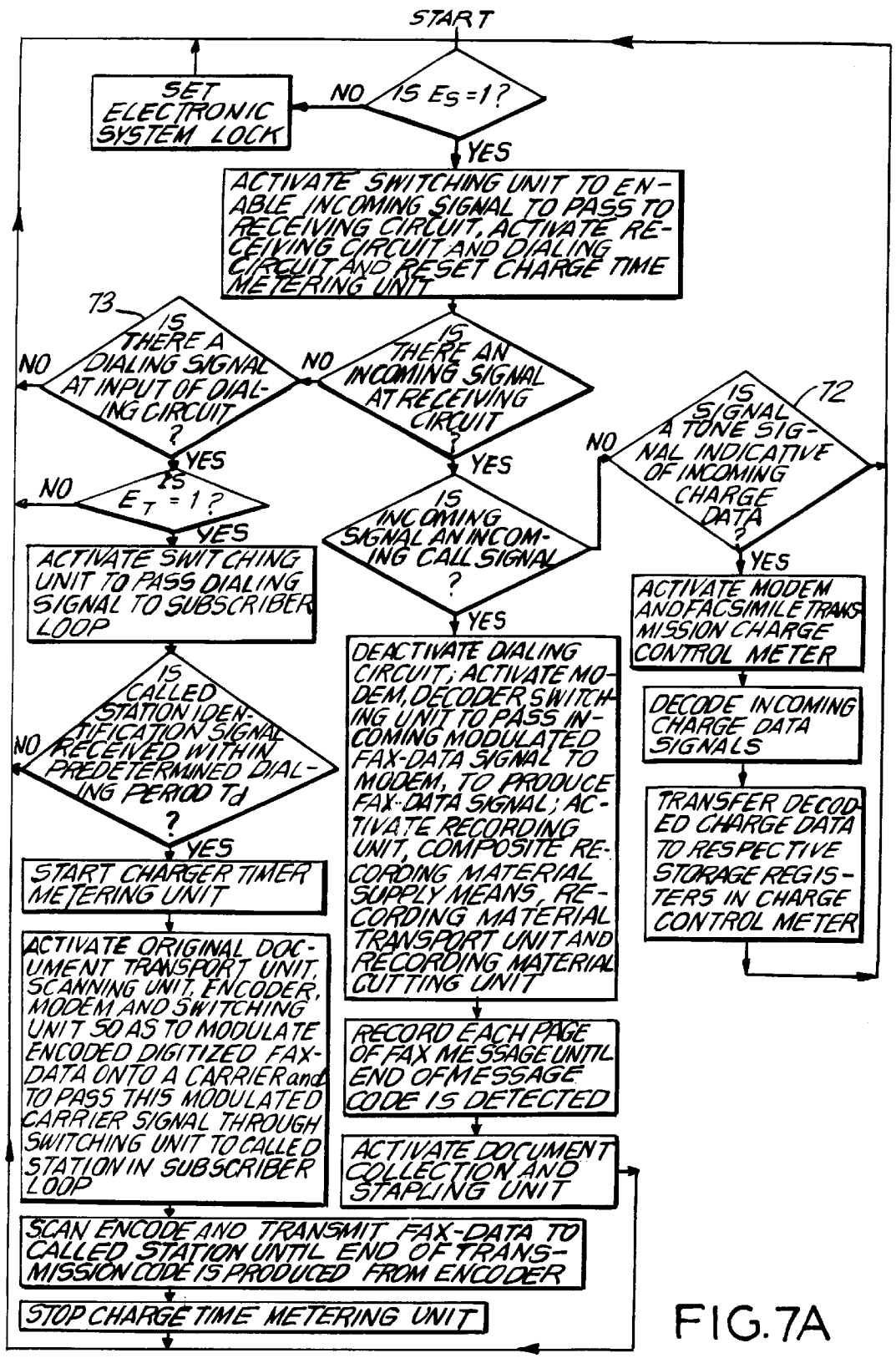
FIG. 7A is a system flow chart illustrating the various modes of possible operation of the facsimile system shown in FIG. 5A.

Referring to FIG. 7A, the system operation of the third embodiment of the present invention will be described. As in the previously described embodiments of the facsimile system, system controller 14 checks whether electronic system lock unit 40 is set as hereinbefore described. If it is set and condition $E_T=0$ is true, then system controller 14 activates receiving circuit 13 and directs switching unit 6 to pass all incoming signals to receiving unit 13. If an incoming signal is detected at receiving unit 13 and this signal is an incoming call signal, then after a call establishment protocol is completed, system controller 14 deactivates dialing circuit 12, and activates switching unit 6 and modem 5 so as to pass the incoming modulated facsimile-data signal to modem 5, to produce a facsimile-data signal. Also, system controller 14 activates thermal recording unit 9A, composite material supply unit 42, and transport unit 44. Notably, in this particular embodiment there is no need or desire to employ optical sensing and pattern recognition subunits 36A and 36B for facsimile security selection, as the message securing feature is inherent with the composite recording material. System controller 14 then orchestrates these units to thermally record the pages of the facsimile document. These pages of facsimile document being inherently secure, are then collected and stapled together by unit 47, also under the control of system controller 14. Thereafter, the facsimile system returns to the initial state of operation as shown in FIG. 7A.

As illustrated at block 72 of FIG. 7A, if the receiving circuit 13 receives a tone-type signal indicative of incoming charge data, then system controller 14 activates switching unit 6, modem 5 and charge metering control unit 20. Then system controller 14 orchestrates these components so that the charge data signal is demodulated by the modem and passed to decoder subunit 28 of the charge metering control unit, as described hereinabove. Thereafter, decoded charge data is transferred from the remote charge purchase station, through the subscriber loop, to respective storage registers in charge control metering unit 20. After the charge data transfer process is completed, system controller 14 returns the facsimile system back to its initial state of operation.

In the event that at no incoming signal is received at receiving circuit 13, then as illustrated at block 73, it is possible that a dialing signal initiated by the system user might be present at the input of the dialing circuit. If such a dialing signal is present, then the system controller determines whether or not there is adequate charge available for facsimile transmission. This can be ascertained by determining if condition $E_T=1$ is true. If it is not true, then the facsimile system returns to the initial start state, as shown, and can be recharged by the procedure described hereinabove. If condition $E_T=1$ is true, then system controller 14 first resets charge time metering unit 40. System controller 14 then activates switching unit 6 to pass the dialing signal at dialing circuit 12 to the subscriber loop, where the end office attempts to connect with the called station. If a CSI signal is received within a predetermined dialing time $T_d$, closing the loop, then system controller 14 directs charge time metering subunit 21 to begin metering time, and also activates original document transport unit 35, scanner unit 3, encoder 4, modem 5 and switching unit 6. The system controller then orchestrates the operation of these components so as to scan, original document to produce a digitized facsimile data signal from encoder 4. This data signal is then modulated onto a carrier signal from modem 5, and transmitted through switching unit 6 to the called station in the subscriber loop. When scanning, encoding and data transmission is completed, system controller 14 stops charge time metering unit 21, and directs the facsimile system to return to the initial start state.

Figure 5B:
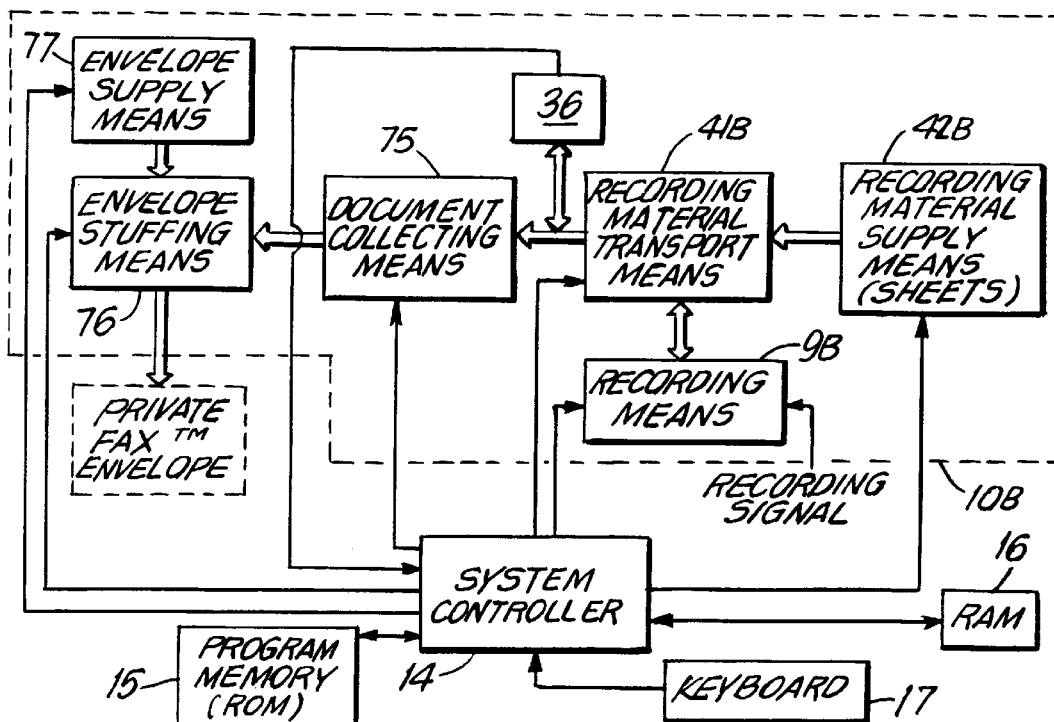
FIG. 5B is a block diagram of the fourth embodiment of the facsimile system of the present invention.

Referring to FIGS. 5 and 5B, the structure and function of the fourth embodiment of facsimile system of the present invention will be described. In FIG. 5B, an alternative embodiment of the selectively-concealing facsimile recording subsystem 10 is shown. For purposes of simplicity subsystem 10B has been shown in FIG. 5B as being associated with only system components 14 through 17. However, as in the previously described embodiments, this subsystem would preferably be associated with system components in FIG. 5.

Subsystem 10B generally comprises a recording unit 9B for printing upon any conventional recording material provided by supply unit 42C and transported through recording unit 9C by transport unit 41B. In the illustrated embodiment of FIG. 5B, recording unit is presumed to be a laser (electrostatic) printer and the recording material is precut sheets of plain paper. Subsystem 10B also includes a facsimile sheet collection unit 75, and a facsimile enclosure unit 76 for mechanically enclosing recorded material within an opaque enclosure supplied from an enclosure supply unit 77. As in the first and second embodiments, all of the subcomponents of this system are under the control of system controller 14. Alternatively, when using a roll of recording paper for recording purposes, a cutting unit would also be provided in this subsystem to precut facsimile sheets prior to enclosure. However, a folding device could be used in lieu of such a cutting device, so as to fold each page over along evenly spaced apart fold lines.

Figure 7B:
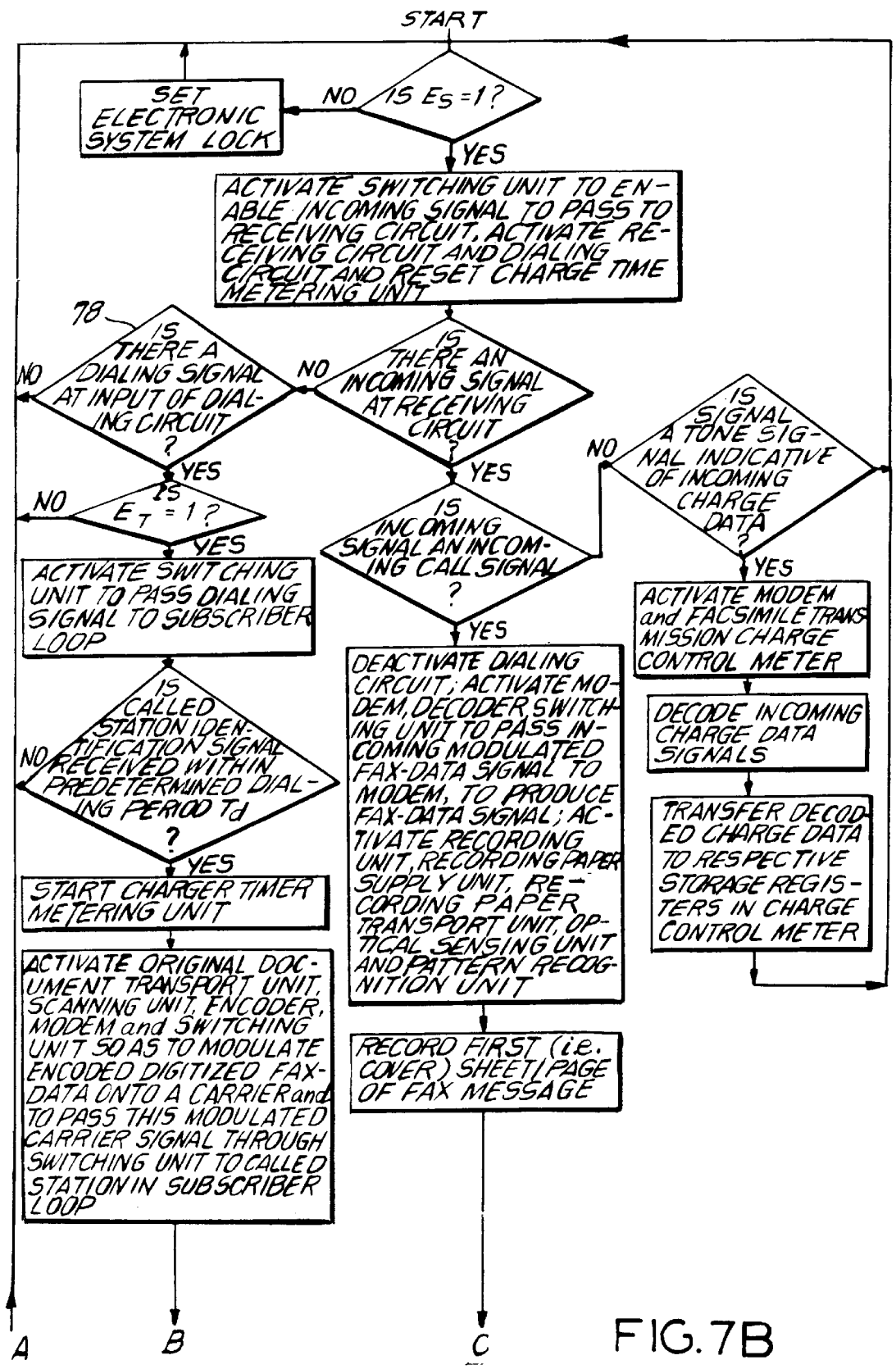
FIG. 7B is a system flow chart illustrating the various modes of possible operation of the facsimile system shown in FIG. 5B.
Figure 7B:
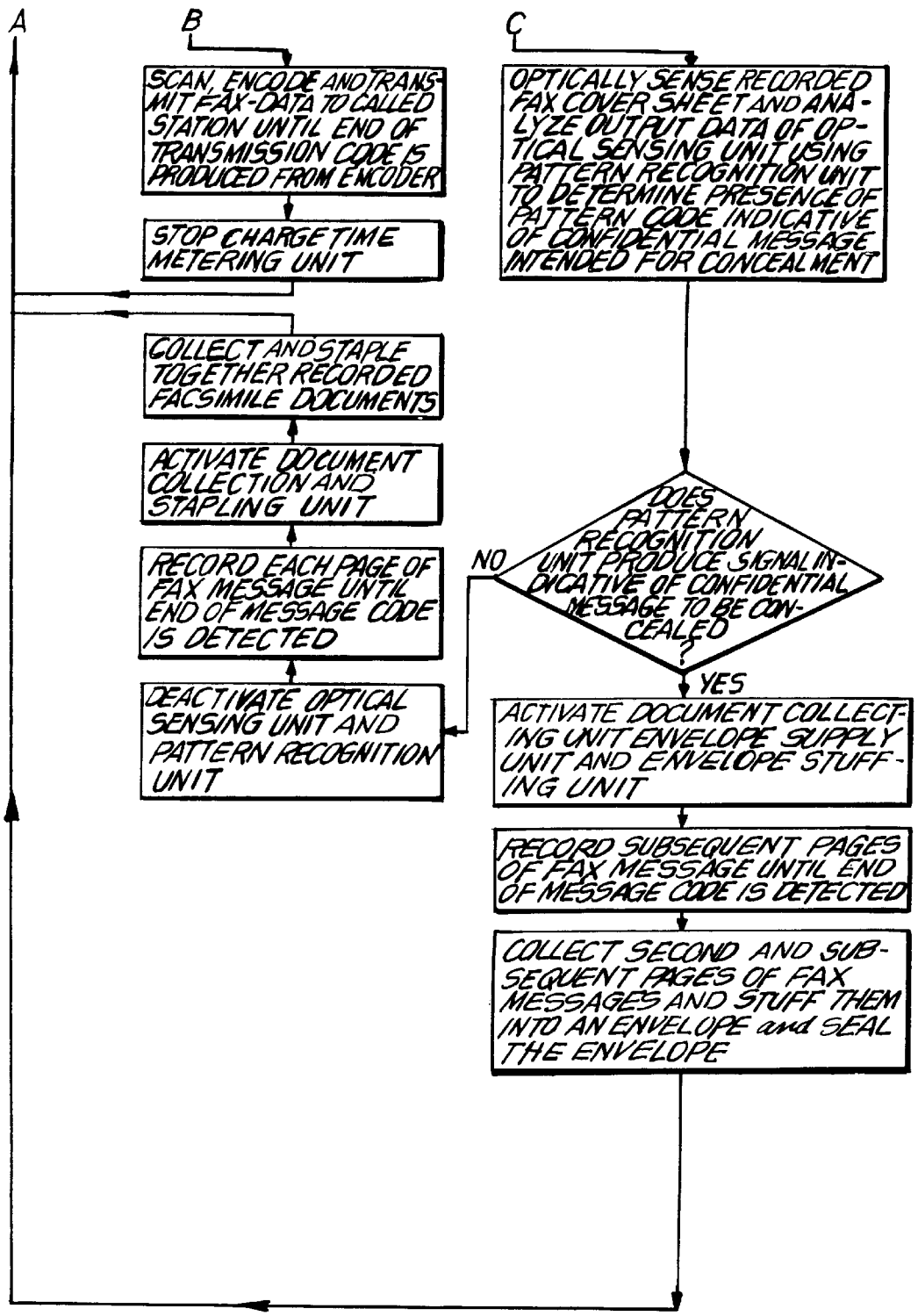

Referring to FIG. 7B, the system operation of the fourth embodiment will be described. As in the previously described embodiments of the facsimile system, system controller checks whether electronic system lock unit 40 is set as hereinbefore described. If it is, then system controller 14 activates receiving circuit 13 and directs switching unit 6 to pass all incoming signals to receiving unit 13. If an incoming signal is detected at receiving unit 13, and this signal is an incoming call signal, then after call establishment protocol is completed, system controller 14 deactivates dialing circuit 12, and activates switching unit 6 and modem 5 so as to pass the incoming modulated facsimile-data signal to modem 5, to produce the facsimile-data signal. Also, system controller 14 activates facsimile recording unit 9B supply unit 42B, transport unit 41B, and optical sensing and pattern recognition subunits 36A and 36B. Thereafter, system controller 14 orchestrates these units as hereinbefore described, to record the first (e.g. cover) sheet or page of the facsimile document.

As the facsimile cover sheet is being reproduced, optical sensing unit 36A optically senses information recorded on the surface of the facsimile cover sheet, and produces a stream of output scan data. Therewhile, pattern recognition subunit 36B analyzes this scan data and determines whether or not a predefined pattern code (e.g. bar code) is present, indicative that the subsequent pages of the transmission contains confidential information which is to be concealed or otherwise secured. If the pattern recognition subunit 36B produces a signal indicating that a confidential message is to be concealed, then system controller 14 activates supply unit 77, facsimile document collection unit 75 and facsimile enclosing unit 76. Then, system controller 14 orchestrates the above-identified units to continue printing the remaining (i.e. second through the last) pages of the facsimile document, and collecting together these pages using collection unit 75, and then inserting these collected facsimile pages into an opaque enclosure, which is subsequently sealed. Thereafter, the unconcealed facsimile cover sheet is stapled or otherwise affixed to the sealed enclosure. Alternatively, an opaque enclosure can be used having an optically transparent opening through which the facsimile cover sheet is visible. At this stage of operation, system controller 14 returns the system to its initial state of operation, as shown in FIG. 7B.

If pattern recognition subunit 36B produces a signal indicating that the pages of the following facsimile document are not to be concealed, then system controller 14 deactivates optical sensing and pattern recognition subunits 36A and 36B, and orchestrates units 9, 41B, 42B and 75 to record, collect and staple together the sheets of the facsimile document. Thereafter, system controller 14 again returns the facsimile system to its initial state of operation.

In the event that no incoming signal is received at receiving circuit 13, then as illustrated at block 78 of FIG. 7B, it is possible that a dialing signal initiated by the system user might be present at the input of the dialing circuit. If such a dialing signal is present, then the system controller determines whether or not there is adequate charge available for facsimile transmission. If there is insufficient charge, then the system returns to the initial start state, as shown, and can be recharged by the procedure described hereinabove. If there is sufficient charge (i.e., condition $E_T=1$ is true), then system controller 14 first resets charge time metering unit 21. System controller 14 then activates switching unit 6 to pass the dialing signal at dialing circuit 12 to the subscriber loop, where the end office attempts to connect with the called station. If CSI signal is received within a predetermined dialing time $T_d$, closing the loop, then system controller 14 directs charge time metering subunit 21 to begin metering charge time, and also activates original document transport unit 35, scanner unit 3, encoder 4', modem 5 and switching unit 6, as hereinbefore described. The system controller 14 then orchestrates the operation of these components so as to scan the original document to produce a digitized facsimile data signal from encoder 4'. This data signal is then modulated onto a carrier signal from modem 5, and transmitted through switching unit 6 to the called station in the subscriber loop. When scanning, encoding and data transmission is completed, system controller 14 stops charge time metering unit 21, and directs the facsimile system to return to the initial state of operation.

Figure 5C:
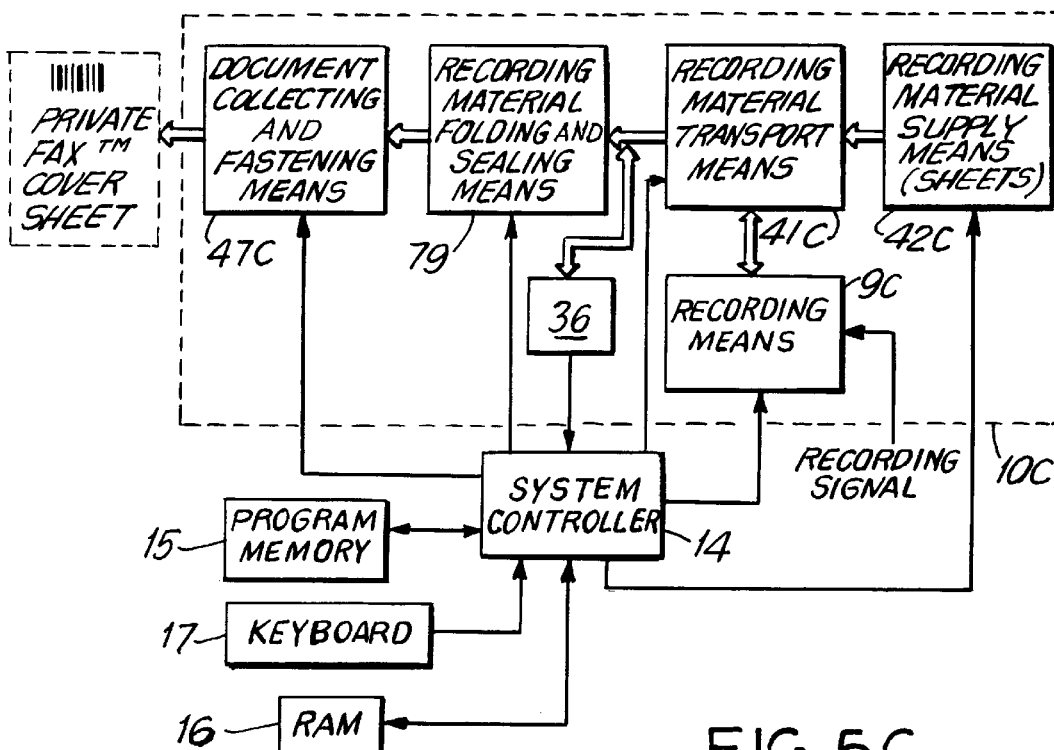
FIG. 5C is a block diagram of the fifth embodiment of the facsimile system of the present invention.

Referring to FIGS. 5 and 5C, the structure and function of the fifth embodiment of facsimile system of the present invention will be described. In FIG. 5C, an alternative embodiment of the facsimile recording and selectively-concealing subsystem 10 is shown. For purposes of simplicity, subsystem 10C has been shown in FIG. 5C as being associated with only system components 9C and 14 through 17. However, as in the previously described embodiments, this subsystem would preferably be associated with system components illustrated in FIG. 5.

Subsystem 10C generally comprises recording unit 9C for printing upon any conventional recording material provided by supply unit 42C and transported through the recording unit by transport unit 41C. In the illustrated embodiment of FIG. 5C, recording unit 9C is presumed to be a laser (electrostatic) printer and the recording material is precut sheets of plain paper. Subsystem 10C also includes a recording material folding and sealing unit 79 for mechanically folding recorded material into a desired configuration which can be adequately sealed using, for example, an adhesive or fastening device such as a staple or an adhesive seal label. As in the first, second and third embodiments, all of the subcomponents of this system are under the control of system controller 14. Preferably, when using a roll of recording paper for recording purposes, a cutting unit (not shown) would also be provided before the folding and sealing unit of this subsystem, for precutting facsimile sheets prior to folding and sealing.

Referring to FIG. 76C, the system operation of the fifth embodiment will be described. As in the previously described embodiments of the facsimile system, system controller 14 checks whether electronic system lock unit 40 is set as hereinbefore described. If it is, then system controller 14 activates receiving circuit 13 and directs switching unit 6 to pass all incoming signals to receiving unit 13. If an incoming signal is detected at the receiving unit, and this signal is an incoming call signal, then after a call establishment protocol is completed, system controller 14 deactivates dialing circuit 12, and activates switching unit 6 and modem 5 so as to pass the incoming modulated facsimile-data signal to the modem, to produce the facsimile-data signal. Simultaneously, system controller 14 activates facsimile recording unit 9C, supply unit 42C, transport unit 41C, and optical sensing and pattern recognition subunits 36A and 36B. Thereafter, system controller 14 orchestrates these units as hereinbefore described, to record the first (e.g. cover) sheet or page of the facsimile document.

As the facsimile cover sheet is being reproduced, optical sensing unit 36A optically senses information recorded on its surface and produces a stream of output scan data. Therewhile, pattern recognition subunit 36B analyzes this scan data and determines whether or not a predefined pattern code is present, indicating that the subsequent pages of the transmission contains confidential information which is to be concealed.

If the pattern recognition subunit 36B produces a signal indicative of a confidential message to be concealed, then system controller 14 activates supply unit 42C, transport unit 41C, folding and sealing unit 79 and facsimile document collection and fastening unit 47C. Then, system controller 14 orchestrates the above-identified units to continue printing the remaining pages of the facsimile document, then fold and seal separately, the second through the last facsimile pages. Then the cover page and folded and sealed facsimile sheets are collected together using collection unit 47C. Thereafter, the collected folded sheets are stapled or otherwise affixed together, along with the unfolded cover facsimile sheet. At this stage of operation, system controller 14 returns the system to its initial state of operation, as shown in FIG. 7C.

If, on the other hand, pattern recognition subunit 36B produces a signal indicating that the pages of the following facsimile document are not to be concealed, then system controller 14 deactivates the optical sensing and pattern recognition subunits, and orchestrates units 9C, 41C, 42C and 47C to record, collect and staple together the sheets of the facsimile document. Thereafter, system controller 14 returns the facsimile system to the start state of operation.

Figure 7C:
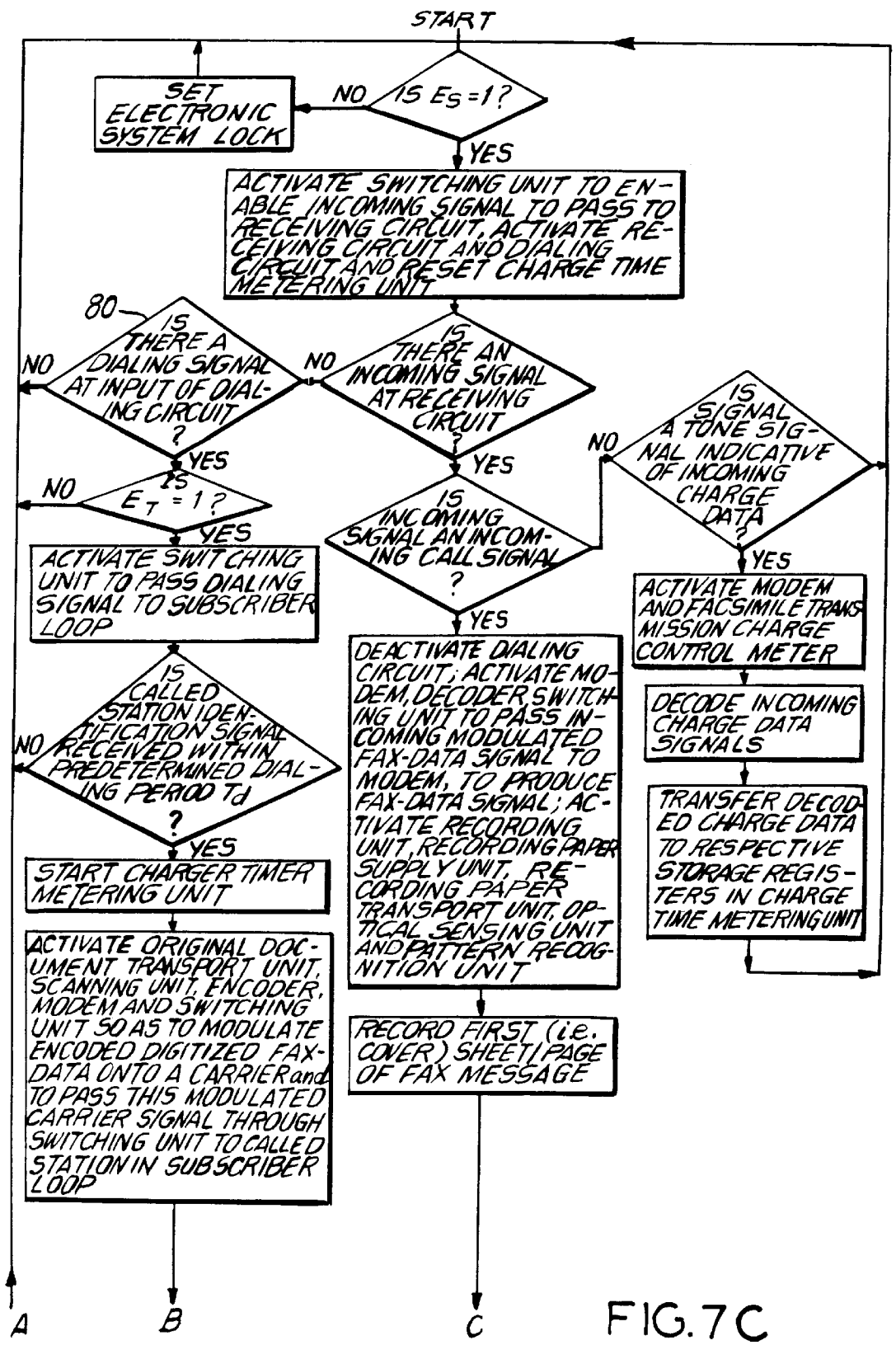
FIG. 7C is a system flow chart illustrating the various modes of possible operation of the facsimile system shown in FIG. 5C.
Figure 7C:
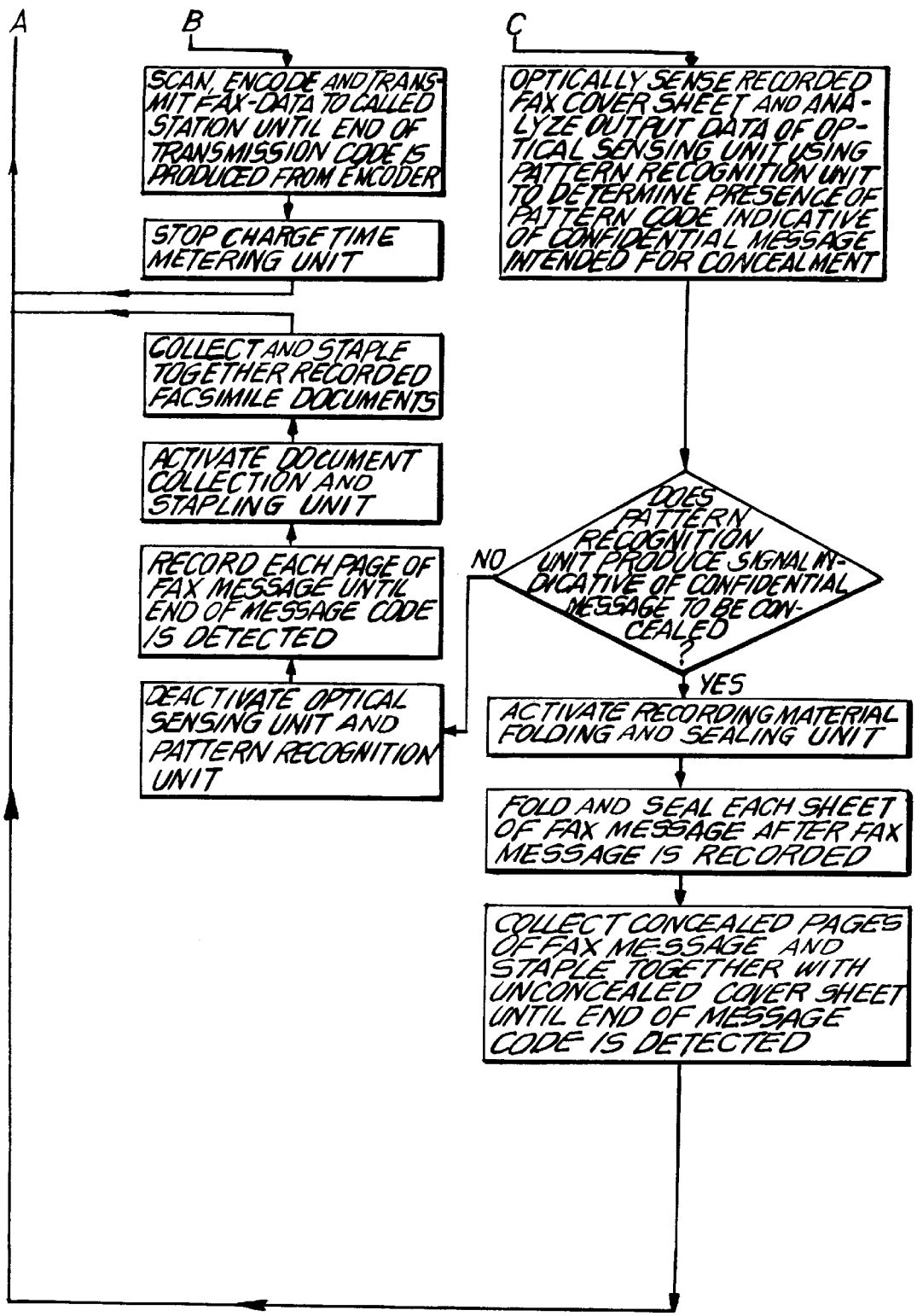

In the event that no incoming signal is received at the receiving circuit, then as illustrated at block 80 of FIG. 7C, it is possible that a dialing signal, initiated by the system user, might be present at the input of the dialing circuit. If such a dialing signal is present, then system controller 14 determines whether or not there is adequate charge available for facsimile transmission. If there is not, then the facsimile system returns to the initial start state of operation, as shown, and can be recharged by the procedure described hereinabove. If there is sufficient charge, then system controller 14 first resets charge time metering unit 21. System controller 14 then activates switching unit 6 to pass the dialing signal at dialing circuit 12 to the subscriber loop, where end office attempts to connect with the called station. If CSI signal is received within a predetermined dialing time $T_d$, closing the subscriber loop, then system controller 14 directs charge time metering subunit 21 to begin metering time, and also activates original document transport unit 35, scanner unit 3, encoder 4', modem 5 and switching unit 6, as hereinbefore described. The system controller 14 then orchestrates the operation of these components so as to scan the original document to produce a digitized facsimile data signal from encoder 4'. This data signal is then modulated onto a carrier signal from modem 5, and transmitted through switching unit 6 to the called station in the subscriber loop. When scanning, encoding and data transmission operations are completed, system controller 14 stops charge time metering unit 21, and directs facsimile system to return to the initial state of operation.

Referring to FIGS. 8 through 10B, several embodiments of a facsimile accessory device in accordance with the present invention, will be described.

Figure 8:
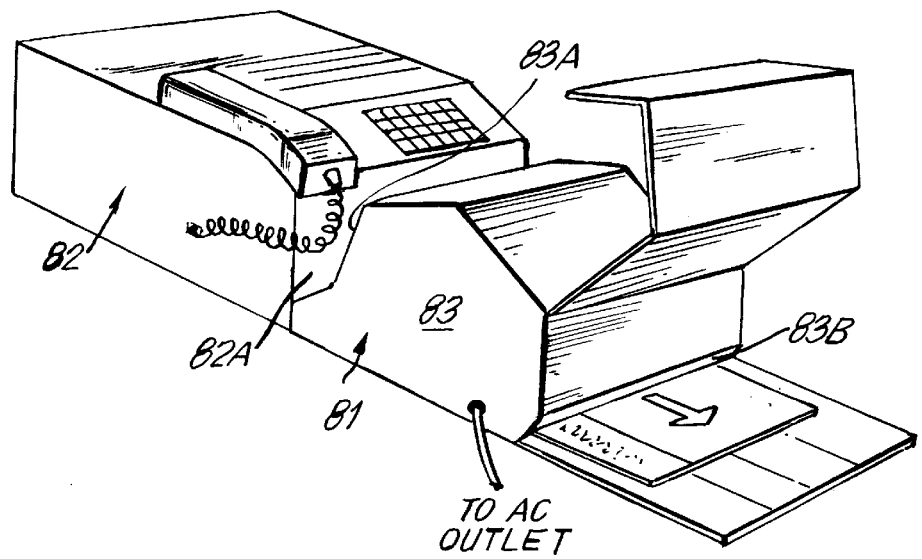
FIG. 8 is a schematic representation of a facsimile accessory device in accordance with the present invention and adapted for use with conventional facsimile apparatus and selectively securing an information bearing facsimile document produced therefrom.
Figure 8A:
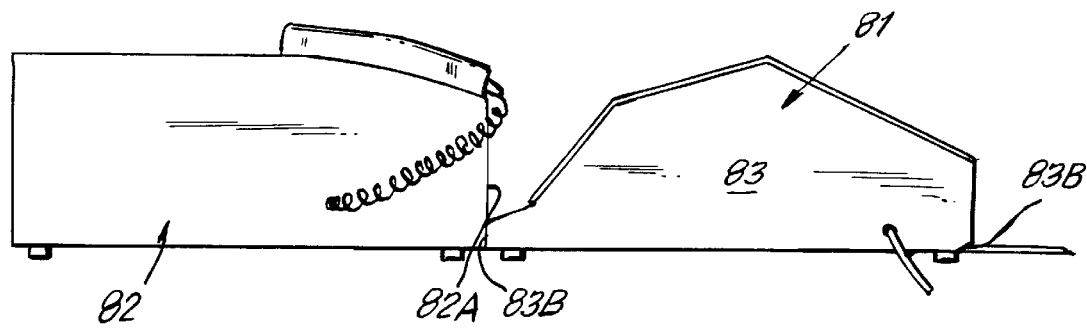
FIG. 8A is an elevated side view of the facsimile accessory device illustrated in FIG. 8.

In FIG. 8, an embodiment of a facsimile accessory device 81 is shown operatively associated with the output port 82A of a conventional facsimile machine 82. As shown, accessory device 81 includes an optically opaque housing 83, having a facsimile input port 83A, through which an ejected facsimile document from facsimile machine 83 can pass into a receiving portion of the accessory device. While not shown, facsimile machine 82 has a facsimile recording means for producing unconcealed facsimile documents. After being analyzed and processed within housing 83 in a manner to be described hereinbelow, the facsimile accessory device ejects from its facsimile output port 83B, either a concealed or unconcealed facsimile document for delivery to the addressee thereof.

Figure 9A:
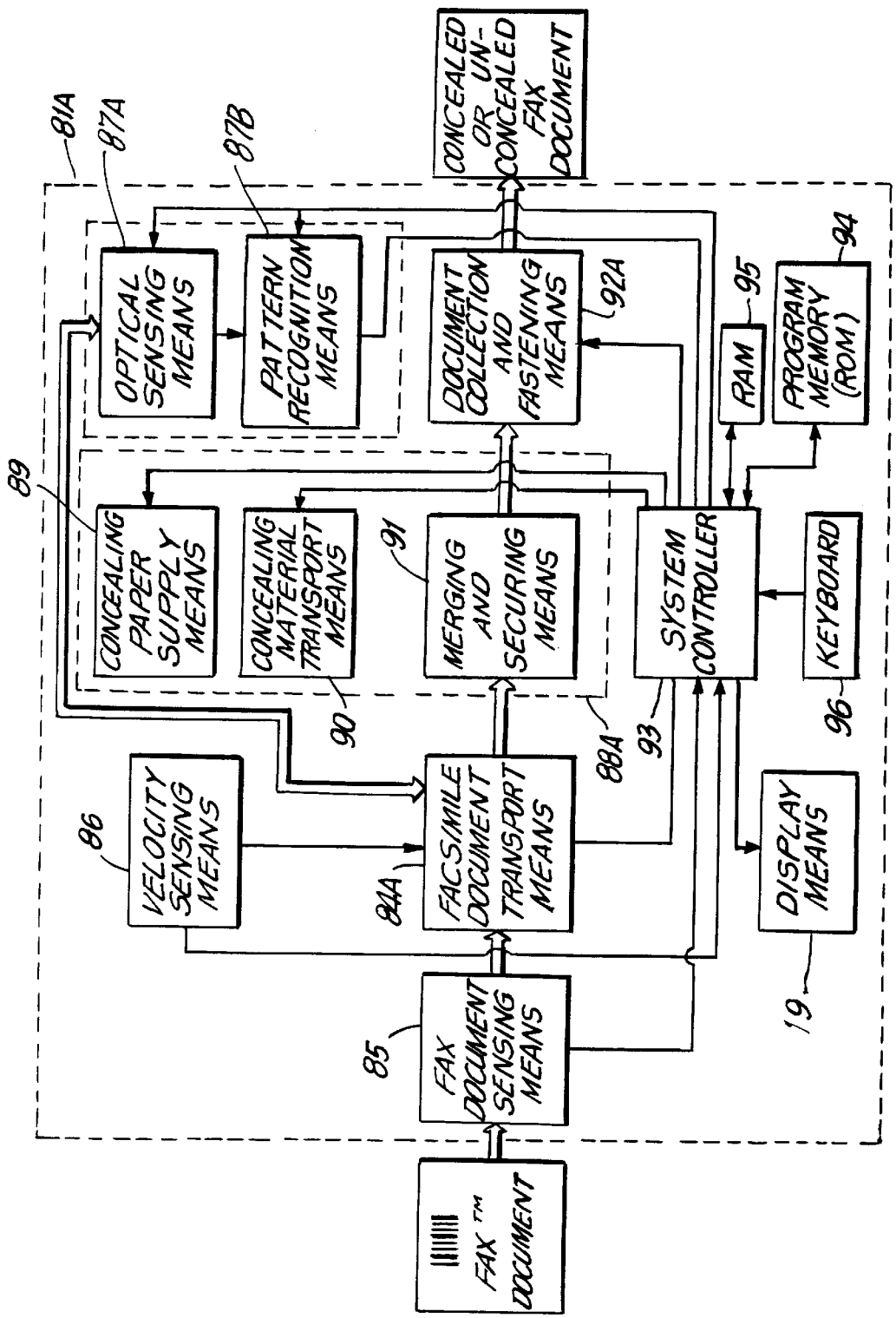
FIG. 9A is a block functional diagram of a first embodiment of the facsimile accessory device illustrated in FIGS. 8 and 8A.

As illustrated in FIG. 9A, a first embodiment of facsimile accessory device 81 comprises a facsimile document transport mechanism or unit 84A, a facsimile document sensing unit 85, a velocity sensing unit 86, a symbol recognition unit 87 and a facsimile message (i.e. information) concealing subsystem generally indicated in this embodiment of the present invention by references numeral 88A. Facsimile information concealing subsystem 88A comprises concealing material supply unit 89, concealing material transport unit 90, and material layer merging and sealing unit 91. A facsimile document collection and fastening unit 92 is also provided for collecting sheets of facsimile documents and fastening then together in a manner described in greater detail hereinafter.

The above-identified system components are operably associated with a system controller 93 for controlling the operation of these system components. As shown, control lines extend between system controller 93 and system components 85 through 91. Over these lines, control signals are transmitted to control the operation of such components in a manner to be described hereinafter. System controller 93, in the form of a microprocessor, is further associated with a read-only memory (ROM) 94 for storing program instructions necessary to implement desired system control and message securing functions. Also, random-access memory (RAM) 95 is associated with system controller 93 for storing instructions concerning prespecified symbol codes, commands, facsimile message formats and the like. A keypad input device 96 is also connected to system controller 93 for entry of commands, symbol codes and the like into RAM 95. A display means is also associated with system controller 93, for displaying system status information.

Facsimile document transport unit 84 can be realized by virtually any mechanism which is capable of controllably transporting a facsimile document injected into the receiving portion of housing 83, through a predefined pathway within the housing so that each injected document sheet can be subject to optical sensing by symbol recognition unit 87, and selected processing by facsimile message concealing subsystem 88A.

The function of facsimile document sensing unit 85 is to detect the presence of a facsimile document being ejected from the output port 82A of facsimile machine 82, and guidably injected into the receiving portion of the facsimile accessory device. In the preferred embodiment, sensing unit 85 includes an infra-red light producing circuit which establishes an infra-red light beam across the receiving portion of the housing. Sensing unit 85 also includes a light detection circuit which is operably associated with the light beam, such that a facsimile document detection signal is generated when the beam is interrupted by the presence of an injected facsimile document. In the preferred embodiment, velocity sensing unit 86 optically senses the injected facsimile document within the housing receiving portion, i.e. after detection by sensing unit 85, and computes, in real-time, velocity information which is provided to system controller 93. Notably, in an alternative embodiment, sensing units 85 and 86 can be combined into a single unit adapted to carry out each separate sensing function.

With the availability of document velocity information on a real-time basis, system controller 93 controls the incremental advancement of the facsimile document along the pathway of transport mechanism 84A. In this way, if facsimile machine 82 temporarily ceases to eject the facsimile document from output port 82A, transport unit 84A will be instantaneously stopped from advancing the partially received facsimile document along the transport pathway. In essence, the combination of velocity sensing unit 86 in a feedback loop with system controller 93, provides a "jogging" capability to the accessory device, and thereby prevents jamming of injected facsimile sheets.

Preferably, material merging and sealing unit 91, also having a document intake capability, will be disposed downstream along the transport pathway a distance greater than the length of a standard facsimile sheet (e.g. 11.5"). This condition will ensure that unit 91 need not be controlled by system controller 93 while document velocity information is being gathered by velocity sensing unit 86.

In facsimile accessory device 81 shown in FIG. 9A, symbol recognition unit 87 comprises an optical sensing subunit 87A and a pattern recognition subunit 87B, as hereinbefore described in connection with facsimile system 1 of the present invention. The function of symbol recognition unit 87 is twofold. Firstly, it should determine whether or not an injected facsimile document being moved along the transport pathway, bears a symbol code indicative of confidential facsimile information, and preferably also the number of pages in the facsimile document. Secondly, it should inform system controller 93 of these facts so that it will direct facsimile information concealing system 88A to conceal or otherwise secure selected portions of the received facsimile document sheets.

In facsimile information concealing subsystem 88A of FIG. 9A, transport unit 84A provides the fully injected facsimile document sheet to a first input port of merging and sealing unit 91. Provided to a second input of merging and sealing unit 91 is a layer of information concealing material provided from supply unit 89 and transported by transport unit 90, as shown. The information concealing material is essentially opaque to visible radiation and the facsimile recording sheet can be of any known type of recording material known in the art. Layer merging and sealing unit 91, in essence, joins or merges the two layers together so that the top most concealing layer is disposed over the graphical and other information of the recorded facsimile layer. Prior to this merging operation, a thin narrow line of sealing adhesive is applied between these overlapping layers, along the perimetrical areas thereof. Alternatively, thin narrow layers of curable adhesive can be preapplied to the outer opposite edges of the concealing layer, with pairs of strips of non-curable tack-type releasable adhesive applied longitudinally along this layer. The layers are then compressed together, and if necessary, cured by heat or other radiation, to produce a composite facsimile document. Composite sheets of concealed facsimile documents are then collected in the collection compartment of unit 92 and subsequently stapled together and ejected out from facsimile outlet port 83B, under the control of system controller 93.

Figure 10A:
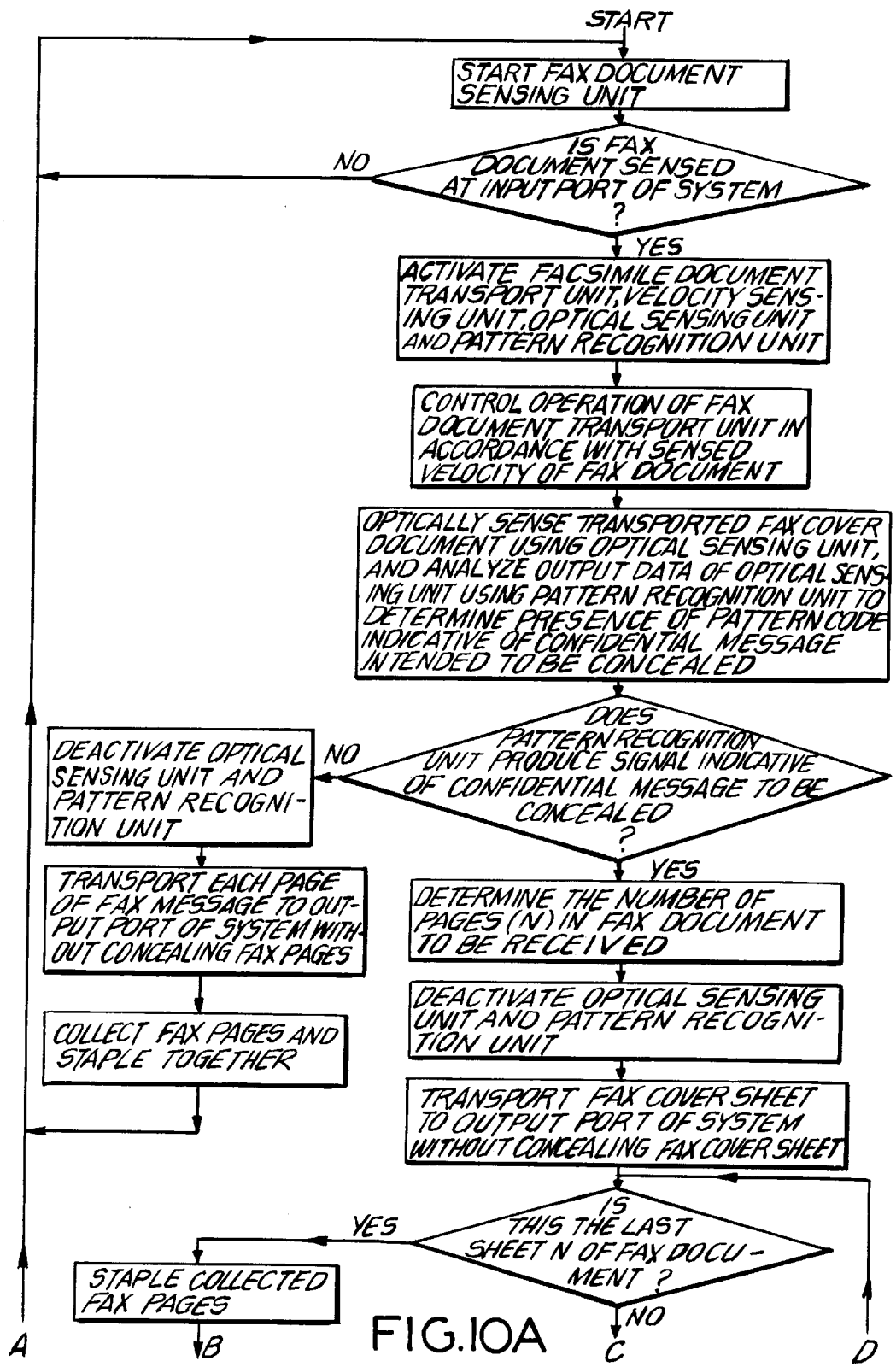
FIG. 10A is a system flow chart illustrating the various modes of possible operation of the facsimile accessory device shown in FIG. 9A.
Figure 10A:
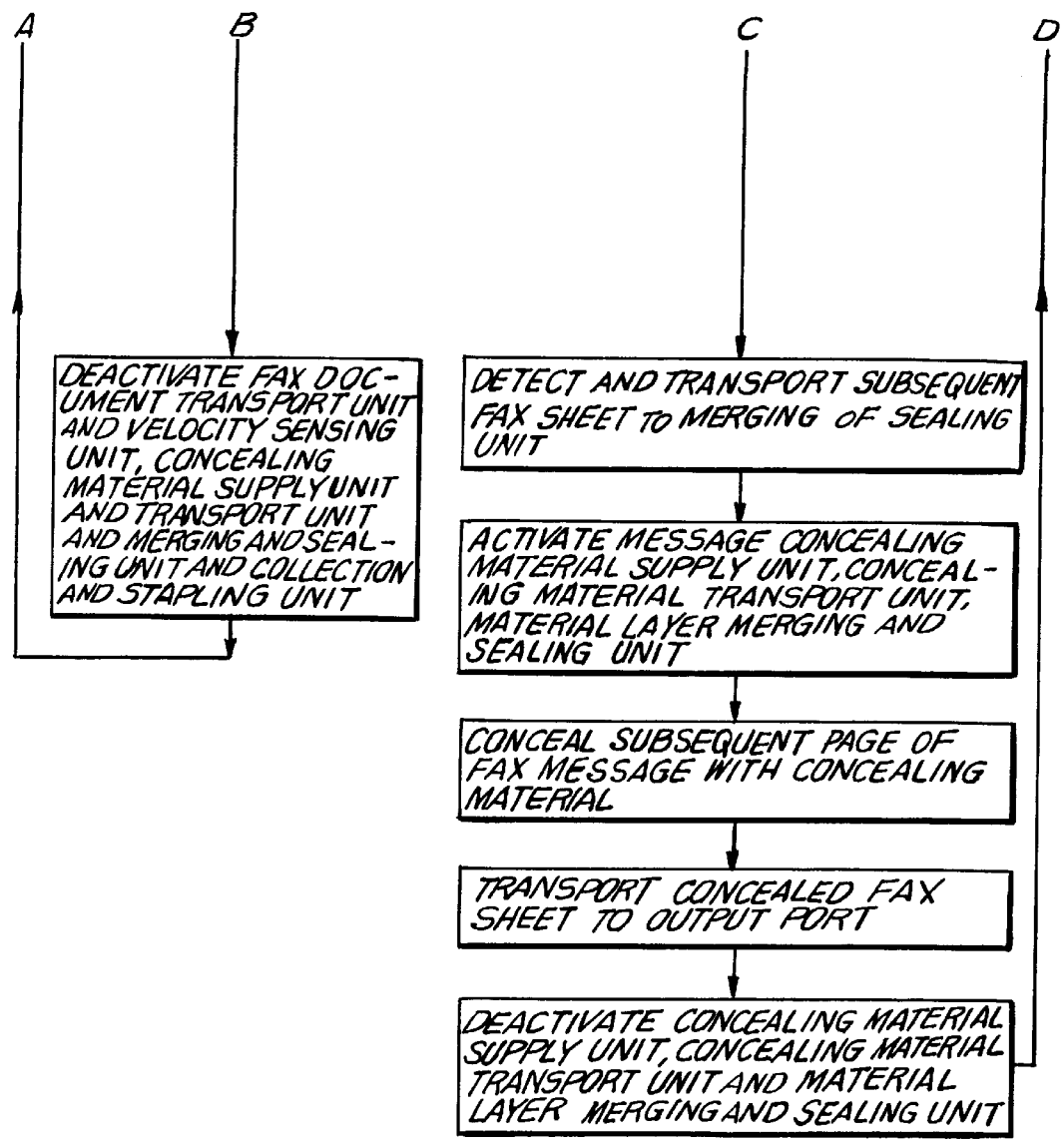

Referring to FIG. 10A, the system operation of the first embodiment of facsimile accessory device 81A, will now be described. As illustrated in the system flow chart of FIG. 10A, system controller 93 in its first or start up state of operation, determines whether or not an injected facsimile document is sensed at the facsimile input port 83A of the facsimile system. This function is achieved by sensing unit 85 in operative association with system controller 93. If an injected facsimile document (e.g., facsimile cover sheet) is present at the input port of housing 83, then system controller 93 activates transport unit 84A, velocity sensing unit 86 and symbol recognition unit 87. Thereafter, system controller 93 orchestrates these system components so that transport unit 88A advances the detected facsimile cover sheet along the transport pathway in accordance with the sensed velocity of the injected document in the housing receiving portion. After the facsimile document sheet is completely ejected from the facsimile machine 82, as detected by facsimile document sensing unit 85, system controller 93 directs the optical sensing subunit 87 to optically sense information recorded on the surface of the facsimile sheet and produce a stream of output scan data. Therewhile, the pattern recognition subunit 87B analyzes this scan data and determines whether or not a predefined pattern code (e.g. bar code), is present, indicating that the subsequent facsimile pages of the transmission contains confidential information which is to be concealed or otherwise secured. Also, subunit 87B searches for a pattern code indicating of the total number of sheets (i.e., N) in the facsimile document being received by the accessory device.

If the pattern recognition subunit 87B produces a signal indicative of a confidential message to be concealed, then system controller 93 deactivates the optical sensing and pattern recognition subunits, and directs transport unit 88A to advance the optically scanned facsimile cover sheet to the collection bin of unit 92, without concealing its information content. Thereafter, system controller 93 awaits arrival of the subsequent facsimile page of the document. When the second page is detected by sensing unit 85, system controller 93 orchestrates transport unit 84A and velocity sensing unit 86 to advance the second injected facsimile sheet through and beyond the receiving portion, and towards merging and sealing unit 91. When sensing unit 85 detects that this facsimile sheet is completely ejected from the facsimile machine 82 and is disposed before the merging and sealing unit, system controller 93 activates supply unit 89, transport unit 90 and layer merging and sealing unit 91. Then, system controller 93 orchestrates these units so that merging and sealing unit 91 applies a layer of opaque material over the facsimile information of the transported facsimile sheet, and thereafter transports the concealed facsimile sheet to the collection bin of collection unit 92. System controller 93 then deactivates supply unit 89, transport unit 90 and layer merging and sealing unit 91 and returns the system to a state of operation which continues the above subprocess until the last facsimile sheet has been concealed. When this condition is achieved, then system controller 93 directs unit 92 to fasten together, as by stapling, the unconcealed facsimile cover sheet and the N-1 concealed facsimile sheets collected at the collection bin thereof. Thereafter, the system controller 93 ejects the concealed facsimile document from housing 83 and returns the accessory device to the initial state of operation, as shown in FIG. 10A.

If pattern recognition subunit 87B does not produce a signal indicating that pages of the following facsimile document are not to be concealed, then system controller 93 deactivates optical sensing and pattern recognition subunits, and orchestrates the activated units so that each unconcealed facsimile sheet is transported to the collection bin of unit 92, after which the facsimile cover page and subsequent unconcealed sheets are fastened together. System controller 93, then ejects the unconcealed facsimile document and returns the system back to its initial state of operation.

Figure 9B:
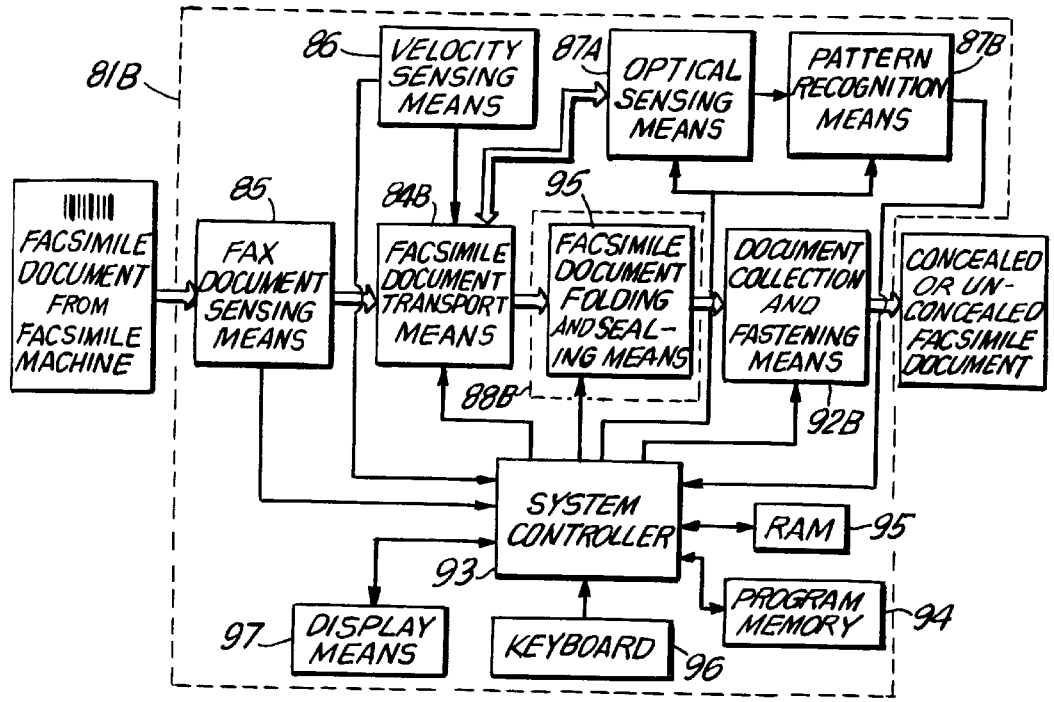
FIG. 9B is a block functional diagram of a second embodiment of the facsimile accessory device of the present invention.

Referring to FIG. 9B, the structure and function of the second embodiment of the facsimile accessory device of the present invention will be described. In FIG. 9B, an alternative embodiment of the facsimile information concealing subsystem 88B is shown, with all other system components being the same as described in the first embodiment shown in FIG. 9A. As illustrated in FIG. 9B, subsystem 88B generally comprises a facsimile document folding and sealing unit 95 for mechanically folding, preferably one at a time, received facsimile sheets into a desired configuration which can be adequately sealed using, for example, an adhesive or fastening device such as a staple or an adhesive seal or label. As in the first embodiment, all of the components are under the control of system controller 93.

Figure 10B:
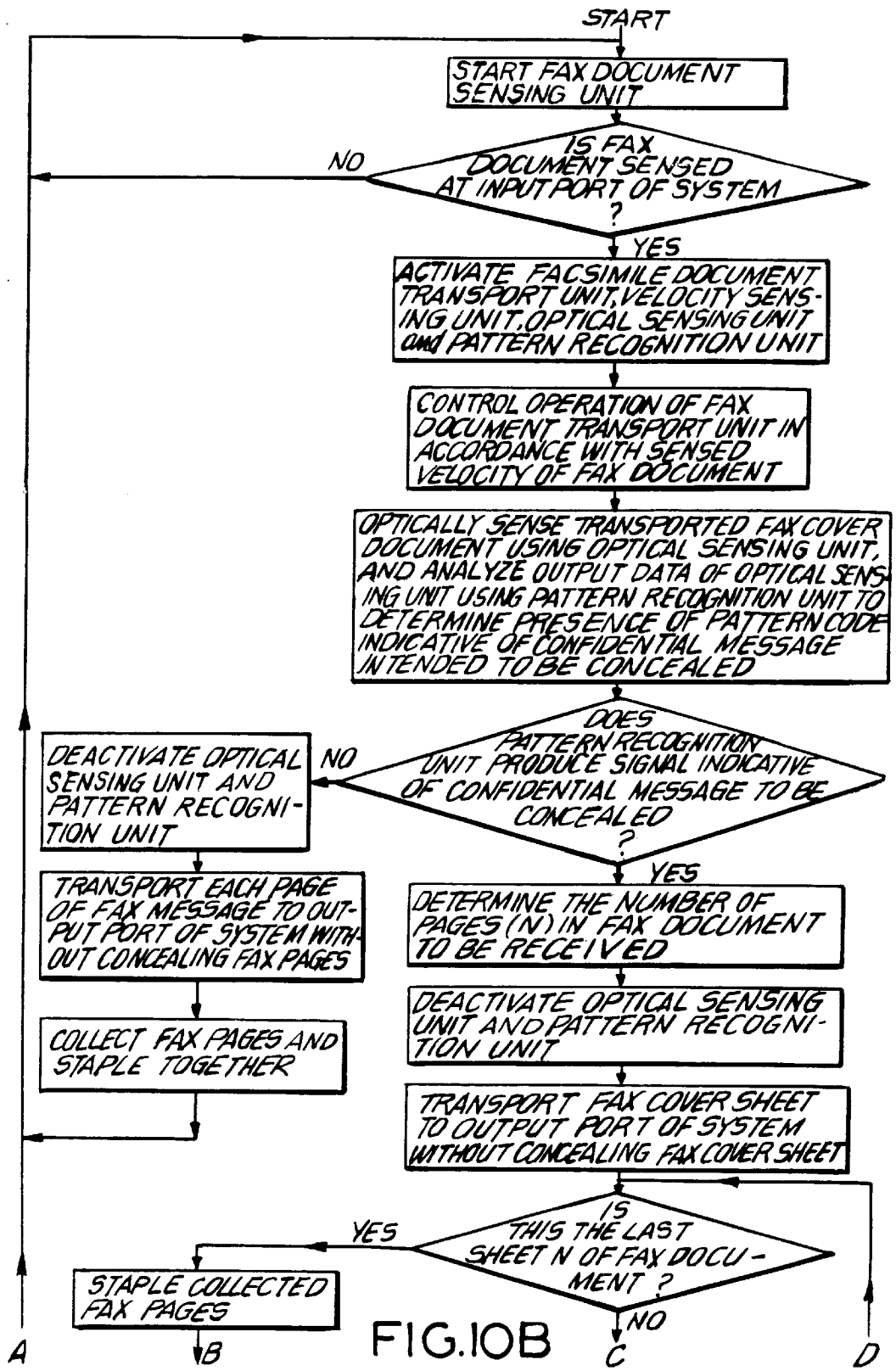
FIG. 10B is a system flow chart illustrating the various modes of possible operation of the facsimile accessory device shown in FIG. 9B.

As illustrated in FIG. 10B, the system operation of this embodiment of the accessory device is similar in nearly all respects of the first embodiment, with the exception that instead of units 89, 90 and 91 of FIG. 9A being activated to perform the concealing function, unit 95 of FIG. 9B is activated and deactivated as indicated.

Figure 9C:
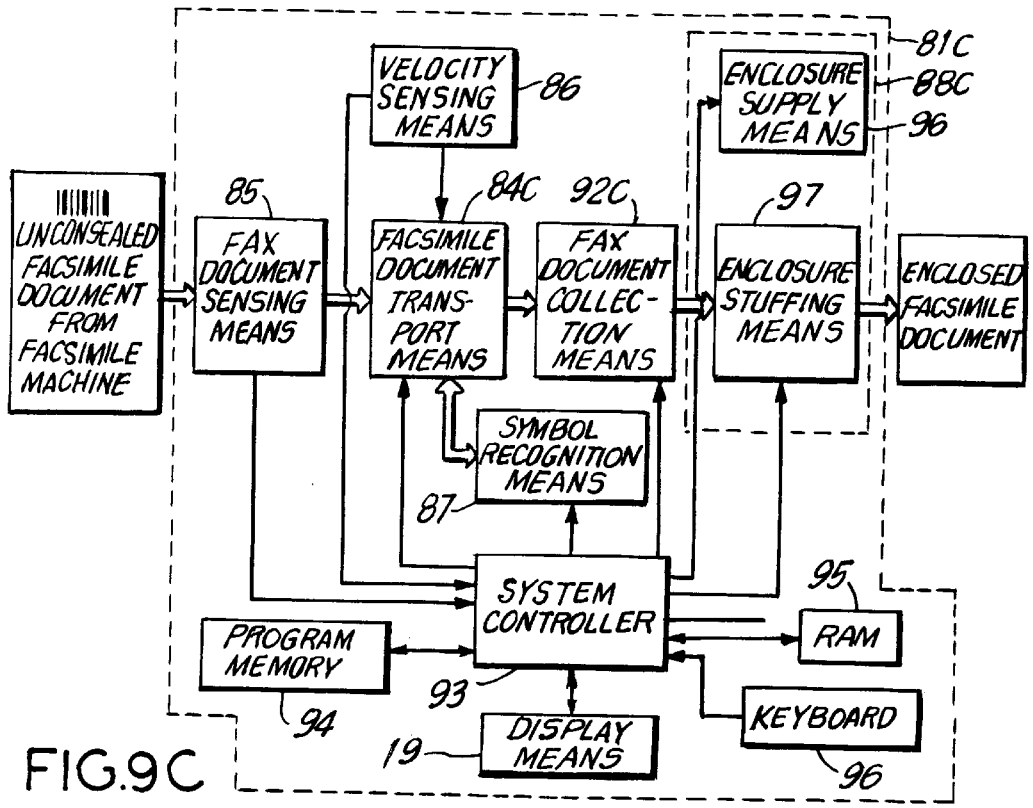
FIG. 9C is a block functional diagram of a third embodiment of the facsimile accessory device of the present invention.

Referring to FIG. 9C, the structure and function of the third embodiment of the facsimile accessory device of the present invention will be described. In FIG. 9C, an alternative embodiment of the facsimile information concealing subsystem 88C is shown, with all other system components being essentially the same as described in the first and second embodiments of the facsimile accessory device.

As illustrated in FIG. 9C, subsystem 88C comprises an enclosure supply unit 96 and a facsimile enclosure unit 97, both disposed beyond facsimile document collection unit 92C. The function of the collection unit 92C is to collect all of the facsimile sheets of particular document received at the receiving portion of the system housing, and to provide these collected facsimile sheets to facsimile enclosure unit 97. The function of facsimile enclosure unit 97 is to mechanically enclose the collected facsimile document sheets within an opaque enclosure supplied from enclosure supply unit 96. As in the first and second embodiments of the facsimile accessory device, all of the subcomponents of this system are under the control of system controller 93.

Figure 10C:
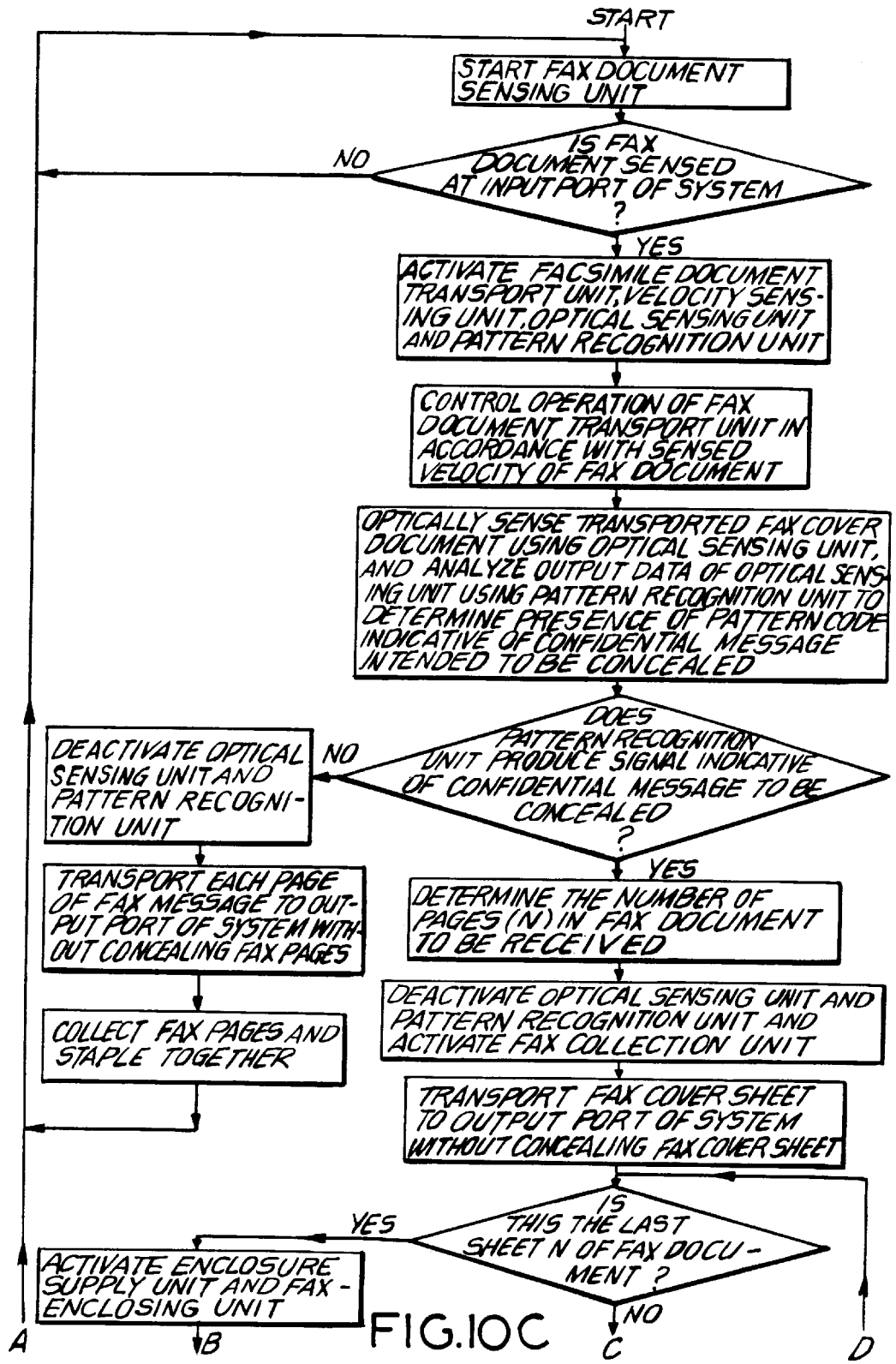
FIG. 10C is a system flow chart illustrating the various modes of possible operation of the facsimile accessory device shown in FIG. 9C.
Figure 10C:
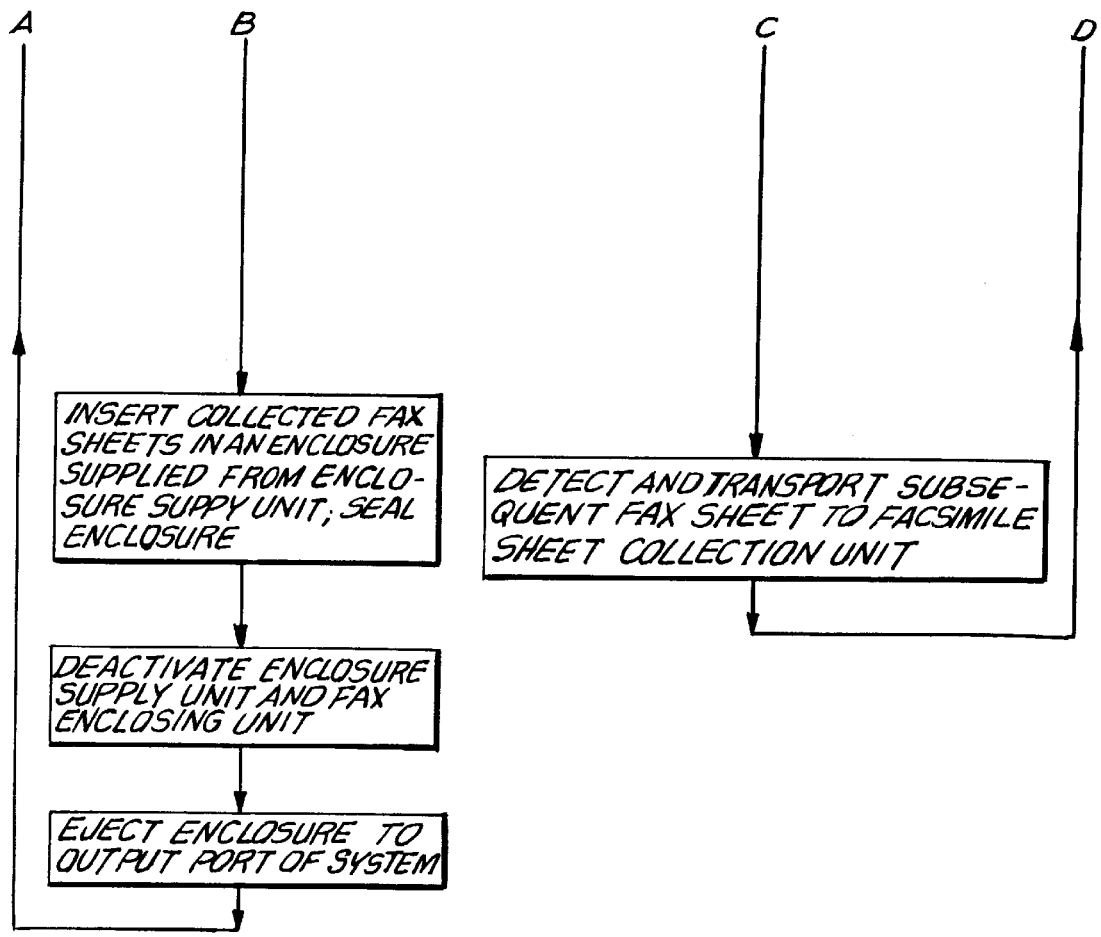

As illustrated in FIG. 10C, the system operation of this embodiment of the accessory device is similar to that of the first and second embodiments described above, with several minor exceptions. As indicated at block 99 of FIG. 10C, after symbol recognition unit 87 has detected symbol codes indicating the arrival of a confidential facsimile document, and preferably the number of pages (N) which it contains, system controller 93 deactivates the optical sensing and pattern recognition subunits, activates facsimile sheet collection unit 92C, and directs transport unit 84C to transport the facsimile cover sheet to the facsimile collection unit 92C. Thereafter, system controller 93 orchestrates the document sensing unit 85, transport unit 84C and velocity sensing unit 86 so as to achieve sequential transport of each subsequent facsimile sheet, to facsimile sheet collection unit 92C. When all N facsimile sheets have been collected, system controller 93 activates enclosure supply unit 96 and enclosing unit 97, and thereafter directs enclosing unit 97 to insert all of the collected facsimile sheets into the enclosure, which is subsequently sealed. Preferably, the enclosure has a transparent front window, through which the facsimile cover sheet is visible to identify the addressee of the facsimile document. Alternatively, all facsimile sheets but the facsimile cover sheet could be inserted within the enclosure, and the cover sheet subsequently affixed thereto, to assure the confidentiality of the received facsimile document. After the enclosure is sealed, system controller 93 deactivates supply unit 96 and enclosing unit 97 and causes the secured facsimile document to be ejected to the output port 83B of the accessory device.

While the particular embodiments shown and described above have proven to be useful in many applications in the facsimile art, further modifications of the present invention herein disclosed will occur to persons skilled in the art to which the present invention pertains, and all such modifications are deemed to be within the scope and spirit of the present invention defined by the appended claims.

What is claimed is:

1. Apparatus for selectively transmitting and receiving facsimile information, comprising:

a housing of generally compact construction;

scanning means disposed in said housing for scanning a first document bearing information and producing a first facsimile data signal representative of said information;

facsimile transmitting means disposed in said housing for transmitting said first facsimile data signal to a selected receiving station remote from said apparatus;

facsimile receiving means disposed in said housing, for receiving a second facsimile data signal from a transmitting station remote from said apparatus, said second facsimile second data signal being representative of information contained in a second document disposed at said remote transmitting station;

facsimile recording means disposed in said housing, for recording a facsimile of said second document on the basis of said received second facsimile data signal;

facsimile information concealing means disposed in said housing, for concealing at least a portion of the information recorded on said facsimile of said second document when said facsimile of said second document is removed from said appratus; and control means, disposed in said housing for selectively controlling the operation of said scanning means, said facsimile transmitting means, said facsimile receiving means, said facsimile recording means, and said facsimile information concealing means.

2. The apparatus of claim 1, which further comprises switching means, disposed in said housing for selectively connecting said facsimile transmitting means with said selected receiving station and for selectively connecting said facsimile receiving means with said transmitting station.

3. The apparatus of claim 1, which further comprises command encoding means, disposed in said housing for selectively encoding said first facsimile data signal with at least one command code indicative of a predefined operation to be enabled or disabled at said selected receiving station.

4. The apparatus of claim 2, wherein said facsimile recording means further comprises recording material supply means for supplying recording material and recording material transport means for transporting said recording material, and wherein said facsimile information concealing means comprises information concealing material supply means for supplying information concealing material, information concealing material transport means for transporting said information concealing material and material layer merging and sealing means for merging and sealing said recording material and said information concealing material so that at least a selected portion of said facsimile information is concealed.

5. The apparatus of claim 4, which further comprises symbol recognizing means, disposed in said housing, for recognizing one or more preselected symbols recorded on said recording material by said facsimile recording means, and wherein said symbol recognizing means is operatively associated with said control means so as to activate the operation of said facsimile information concealing means in response to recognition of at least one of said preselected symbols by said symbol recognizing means.

6. The apparatus of claim 5, wherein said symbol recognizing means comprises an optical sensing means for optically sensing facsimile information recorded on said recording material by said recording means and producing a data stream indicative of symbols in said facsimile information, and pattern recognition means for recognizing the presence of one or more of said predetermined symbols in said data stream.

7. The apparatus of claim 6, wherein said preselected symbols are preselected bar code symbols and wherein said optical sensing means comprises a bar code symbol laser scanner for producing a scan data stream, and said pattern recognition means comprises a bar code symbol decoder for decoding said scan data stream and determining the presence of one or more of said preselected bar code symbols.

8. The apparatus of claim 2, which further comprises facsimile transmission enabling means, disposed in said housing, for enabling the operation of said facsimile transmitting enabling means on the basis of metered accumulation of charge incurred during facsimile transmission and the amount of charge preallocated to said apparatus.

9. The apparatus of claim 8, wherein said facsimile transmission enabling means enables the operation of said facsimile transmitting means so long as said amount of preallocated charge is greater than said accumulated charge incurred during facsimile transmission.

10. The apparatus of claim 9, wherein said facsimile transmission enabling means comprises preallocated charge storage means for storing preallocated charge data corresponding to said preallocated charge, charge rate storage means for storing charge rate data for precharacterized facsimile transmission destinations, charge time metering means for metering charge time lapsed during each facsimile transmission, charge computing means for computing charge incurred during each said facsimile transmission, said incurred charge being computed on the basis of said charge rate data and said charge time associated with each said facsimile transmission, and charge accounting means for accounting the accumulated charge computed for each said facsimile transmission and providing a facsimile transmission enable signal to said control means so long as the amount of said accumulated charge is less than said preallocated charge.

11. The apparatus of claim 10, which further comprises charge rate selection means, disposed in said housing, for selecting from said charge rate storage means, charge rate data associated with the dialing number of each facsimile transmission destination, and providing said selected charge rate data to said charge computing means.

12. The apparatus of claim 11, which further comprises charge data transfer means, disposed in said housing, for transferring preallocated charge data and charge rate data from a remote destination, through said switching means, and to said preallocated charge storage means and said charge rate storage means, respectively.

13. The apparatus of claim 12, wherein said charge data transfer means further includes charge data decoder means for decoding charge data encoded at said remote destination.

14. The apparatus of claim 2, wherein said facsimile recording means comprises a thermal recording means, and wherein said facsimile information concealing means comprises composite recording material supply means for supplying composite recording material having a thermal recording layer and an opaque information concealing layer.

15. The apparatus of claim 2, wherein said facsimile recording means further comprises recording material supply means for supplying recording material, and recording material transport means for transporting said recording material, and wherein said facsimile information concealing means comprises information concealing material supply means for supplying information concealing material, information concealing transport means for transporting said information concealing material, and material layer merging and sealing means for merging and sealing said recording material and said information concealing material so that at least a selected portion of said facsimile information is concealed.

16. The apparatus of claim 2, which further comprises symbol recognizing means for recognizing preselected symbols recorded on said recording material by said facsimile recording means, and wherein said symbol recognizing means is operatively associated with said control means so as to activate the operation of said facsimile information concealing means in response to recognition of at least one of said preselected symbols by said symbol recognizing means.

17. The apparatus of claim 16, wherein said symbol recognizing means comprises an optical sensing means for optically sensing facsimile information recorded on said recording material by said recording means and producing a data stream indicative of symbols in said facsimile information, and pattern recognition means for recognizing the presence of one or more of said predetermined symbols in said data stream.

18. The apparatus of claim 17, wherein said preselected symbols are preselected bar code symbols, and wherein said optical sensing means comprises a bar code symbol laser scanner for producing a scan data stream, and said pattern recognition means comprises a bar code symbol decoder for decoding said scan data stream and determining the presence of one or-more of said preselected bar code symbols.

19. The apparatus of claim 1, which further comprises facsimile transmission enabling means for enabling the operation of said facsimile transmitting enabling means on the basis of metered accumulation of charge incurred during facsimile transmission and the amount of charge preallocated to said apparatus.

20. The apparatus of claim 19, wherein said facsimile transmission enabling means enables the operation of said facsimile transmitting means so long as said amount of preallocated charge is greater than said accumulated charge incurred during facsimile transmission.

21. The apparatus of claim 20, wherein said facsimile transmission enabling means comprises
preallocated charge storage means for storing preallocated charge data corresponding to said preallocated charge,
charge rate storage means for storing charge rate data for precharacterized facsimile transmission destinations,
charge time metering means for metering charge time lapsed during each facsimile transmission,
charge computing means for computing charge incurred during each said facsimile transmission, said incurred charge being computed on the basis of said charge rate data and said charge time associated with each said facsimile transmission,
charge accounting means for accounting the accumulated charge computed for each said facsimile transmission and providing a facsimile transmission enable signal to said control means so long as the amount of said accumulated charge is less than said preallocated charge.

22. The apparatus of claim 21, which further comprises charge rate selection means for selecting from said charge rate storage means, charge rate data associated with the dialing number of the facsimile transmission destination, and providing said selected charge rate to said charge computing means.

23. The apparatus of claim 22, which further comprises charge data transfer means for transferring preallocated charge data and charge rate data from a remote destination, through said switching means, to said preallocated charge storage means and said charge rate storage means, respectively.

24. The apparatus of claim 22, wherein said charge data transfer means further includes a charge data decoder means for decoding charge data encoded at said remote destination.

25. The apparatus of claim 2, wherein said facsimile recording means further comprises recording material supply means for supplying recording material and recording material transport means for transporting said recording material, and wherein said facsimile information concealing means comprises enclosure supply means for supplying enclosures adapted to envelope a predetermined length of recording material and conceal at least a selected portion of said facsimile information, and envelope stuffing means for stuffing said predetermined length of recording material into said enclosure.

26. The apparatus of claim 2, which further comprises symbol recognizing means for recognizing preselected symbols recorded on said recording material by said facsimile recording means, and wherein said symbol recognizing means is operatively associated with said control means so as to activate the operation of said facsimile information concealing means in response to recognition of one of said preselected symbols by said symbol recognizing means.

27. The apparatus of claim 26, wherein said symbol recognizing means comprises an optical sensing means for optically sensing facsimile information recorded on said recording material by said recording means and producing a data stream indicative of symbols in said facsimile information, and pattern recognition means for recognizing the presence of one or more of said predetermined symbols in said data stream.

28. The apparatus of claim 27, wherein said preselected symbols are preselected bar code symbols and wherein said optical sensing means comprises a bar code symbol laser scanner for producing a scan data stream, and said pattern recognition means comprises a bar code symbol decoder for decoding said scan data stream and determining the presence of one or more of said preselected bar code symbols.

29. The apparatus of claim 26, which further comprises facsimile transmission enabling means for enabling the operation of said facsimile transmitting enabling means on the basis of metered accumulation of charge incurred during facsimile transmission and the amount of charge preallocated to said apparatus.

30. The apparatus of claim 29, wherein said facsimile transmission enabling means enables the operation of said facsimile transmitting means so long as said amount of preallocated charge is greater than said accumulated charge incurred during facsimile transmission.

31. The apparatus of claim 30, wherein said facsimile transmission enabling means comprises
preallocated charge storage means for storing preallocated charge data corresponding to said preallocated charge,
charge rate storage means for storing charge rate data for precharacterized facsimile transmission destinations,
charge time metering means for metering charge time lapsed during each facsimile transmission,
charge computing means for computing charge incurred during each said facsimile transmission, said incurred charge being computed on the basis of said charge rate data and said charge time associated with each said facsimile transmission,
charge accounting means for accounting the accumulated charge computed for each said facsimile transmission and providing a facsimile transmission enable signal to said control means so long as the amount of said accumulated charge is less than said preallocated charge.

32. The apparatus of claim 31, which further comprises charge rate selection means for selecting from said charge rate storage means, charge rate data associated with the dialing number of the facsimile transmission destination, and providing said selected charge rate data to said charge computing means.

33. The apparatus of claim 32, which further comprises charge data transfer means for transferring preallocated charge data and charge rate data from a remote destination, through said switching means, to said preallocated charge storage means and said charge rate storage means, respectively.

34. The apparatus of claim 33, wherein said charge data transfer means further includes a charge data decoder means for decoding charge data encoded at said remote destination.

35. The apparatus of claim 2, wherein said facsimile recording means further comprises recording material supply means for supplying recording material and recording material transport means for transporting said recording material, and wherein said facsimile information concealing means comprises recording material folding and sealing means for folding and sealing a predetermined length of said recording material so that a selected portion of said facsimile information is concealed.

36. The apparatus of claim 35, which further comprises symbol recognizing means for recognizing preselected symbols recorded on said recording material by said facsimile recording means, and wherein said symbol recognizing means is operatively associated with said control means so as to activate the operation of said facsimile information concealing means in response to recognition of one of said preselected symbols by said symbol recognizing means.

37. The apparatus of claim 36, wherein said symbol recognizing means comprises an optical sensing means for optically sensing facsimile information recorded on said recording material by said recording means and producing a data stream indicative of symbols in said facsimile information, and pattern recognition means for recognizing the presence of one or more of said predetermined symbols in said data stream.

38. The apparatus of claim 37, wherein said preselected symbols are preselected bar code symbols and wherein said optical sensing means comprises a bar code symbol laser scanner for producing a scan data stream, and said pattern recognition means comprises a bar code symbol decoder for decoding said scan data stream and determining the presence of one or more of said preselected bar code symbols.

39. The apparatus of claim 36, which further comprises facsimile transmission enabling means for enabling the operation of said facsimile transmitting enabling means on the basis of metered accumulation of charge incurred during facsimile transmission and the amount of charge preallocated to said apparatus.

40. The apparatus of claim 39, wherein said facsimile transmission enabling means enables the operation of said facsimile transmitting means so long as said amount of preallocated charge is greater than said accumulated charge incurred during facsimile transmission.

41. The apparatus of claim 40, wherein said facsimile transmission enabling means comprises preallocated charge storage means for storing preallocated charge data corresponding to said preallocated charge, charge rate storage means for storing charge rate data for precharacterized facsimile transmission destinations, charge time metering means for metering charge time lapsed during each facsimile transmission, charge computing means for computing charge incurred during each said facsimile transmission, said incurred charge being computed on the basis of said charge rate data and said charge time associated with each said facsimile transmission, charge accounting means for accounting the accumulated charge computed for each said facsimile transmission and providing a facsimile transmission enable signal to said control means so long as the amount of said accumulated charge is less than said preallocated charge.

42. The apparatus of claim 41, which further comprises charge rate selection means for selecting from said charge rate storage means, charge rate data associated with the dialing number of the facsimile transmission destination, and providing said selected charge rate data to said charge computing means.

43. The apparatus of claim 42, which further comprises charge data transfer means for transferring preallocated charge data and charge rate data from a remote destination, through said switching means, to said preallocated charge storage means and said charge rate storage means, respectively.

44. The apparatus of claim 43, wherein said charge data transfer means further includes a charge data decoder means for decoding charge data encoded at said remote destination.

45. An accessory device for use with facsimile apparatus including a facsimile output port and a recording means for producing an information bearing facsimile document for passage through said facsimile outlet port, said accessory device comprising:

a housing of generally compact construction, having an accessory inlet port and an accessory outlet port, said accessory inlet port being adapted to be brought in operable association with said outlet port of said facsimile apparatus;

facsimile document transport means disposed in said housing and adapted for transporting said facsimile document through said housing and outwardly from said accessory outlet port;

facsimile information concealing means disposed in said housing and adapted for concealing at least a portion of the information recorded on said facsimile document, said concealing means concealing same after said facsimile document has been transported through said accessory outlet port; and control means, disposed in said housing, and adapted for selectively controlling the operation of said facsimile document transport means and said facsimile information concealing means.

46. The accessory device of claim 45, which further comprises facsimile document sensing means disposed in said housing, and proximate said inlet port and capable of producing a facsimile document presence indication signal upon sensing the presence of said facsimile document proximate said accessory inlet port, said facsimile document presence indication signal being provided to said control means, whereupon operation of said facsimile document transport means is initiated.

47. The accessory device of claim 45, which further comprises velocity sensing means disposed in said housing and adapted for sensing the velocity of said facsimile document, so that said control means can control the operation of said facsimile document transport means in accordance with said sensed velocity.

48. The accessory device of claim 46, wherein said facsimile information concealing means comprises information concealing material supply means for supplying information concealing material, information concealing material transport means for transporting said information concealing material, and material layer merging and sealing means for merging and sealing said recording material and said information concealing material so that at least a selected portion of said facsimile information is concealed.

49. The accessory device of claim 46, which further comprises symbol recognizing means, disposed in said housing, for recognizing one or more preselected symbols recorded on said recording material by said facsimile recording means, and wherein said symbol recognizing means is operatively associated with said control means so as to activate the operation of said facsimile information concealing means in response to recognition of at least one of said preselected symbols by said symbol recognizing means.

50. The accessory device of claim 49, wherein said symbol recognizing means comprises an optical sensing means for optically sensing facsimile information recorded on said recording material by said recording means and producing a data stream indicative of symbols in said facsimile information, and pattern recognition means for recognizing the presence of one or more of said predetermined symbols in said data stream.

51. The accessory device of claim 50, wherein said preselected symbols are preselected bar code symbols and wherein said optical sensing means comprises a bar code symbol laser scanner for producing a scan data stream, and said pattern recognition means comprises a bar code symbol decoder for decoding said scan data stream and determining the presence of one or more of said preselected bar code symbols.

52. The accessory device of claim 50, wherein said facsimile information concealing means comprises enclosure supply means for supplying enclosures adapted to enclose a predetermined length of recording material and conceal at least a selected portion of said facsimile information, and enclosure stuffing means for stuffing said predetermined length of recording material into said enclosure.

53. The accessory device of claim 46, which further comprises symbol recognizing means, disposed in said housing, for recognizing preselected symbols recorded on said recording material by said facsimile recording means, and wherein said symbol recognizing means is operatively associated with said control means so as to activate the operation of said facsimile information concealing means in response to recognition of one of said preselected symbols by said symbol recognizing means.

54. The accessory device of claim 53, wherein said symbol recognizing means comprises an optical sensing means for optically sensing facsimile information recorded on said recording material by said recording means and producing a data stream indicative of symbols in said facsimile information, and pattern recognition means for recognizing the presence of one or more of said predetermined symbols in said data stream.

55. The accessory device of claim 54, wherein said preselected symbols are preselected bar code symbols and wherein said optical sensing means comprises a bar code symbol laser scanner for producing a scan data stream, and said pattern recognition means comprises a bar code symbol decoder for decoding said scan data stream and determining the presence of one or more of said preselected bar code symbols.

56. The accessory device of claim 46, wherein said facsimile recording means further comprises recording material supply means for supplying recording material and recording material transport means for transporting said recording material, and wherein said facsimile information concealing means comprises recording material folding and sealing means for folding and sealing a predetermined length of said recording material so that a selected portion of said facsimile information is concealed.

57. The accessory device of claim 56, which further comprises symbol recognizing means for recognizing preselected symbols recorded on said recording material by said facsimile recording means, and wherein said symbol recognizing means is operatively associated with said control means so as to activate the operation of said facsimile information concealing means in response to recognition of one of said preselected symbols by said symbol recognizing means.

58. The accessory device of claim 57, wherein said symbol recognizing means comprises an optical sensing means for optically sensing facsimile information recorded on said recording material by said recording means and producing a data stream indicative of symbols in said facsimile information, and pattern recognition means for recognizing the presence of one or more of said predetermined symbols in said data stream.

59. The accessory device of claim 58, wherein said preselected symbols are preselected bar code symbols and wherein said optical sensing means comprises a bar code symbol laser scanner for producing a scan data stream, and said pattern recognition means comprises a bar code symbol decoder for decoding said scan data stream and determining the presence of one or more of said preselected bar code symbols.

60. A method of delivering a confidential information bearing facsimile message to a selected receiving station having the capability of selectively concealing at least a portion of said confidential message after said facsimile message has been removed from said receiving station, said method comprising:

(a) providing a confidential facsimile message to be delivered to a selected receiving station having a first facsimile message transmnission and receiving means;

(b) providing said facsimile message with a first commend code indicative of a facsimile message concealing operation to be performed at said selected receiving station;

(c) transmitting said facsimile message and said first command code, from a transmitting station having a second facsimile message transmission and receiving means, to said selected receiving station;

(d) receiving said facsimile message and said first command code, at said selected receiving station;

(e) determining the presence of said first command code;

(f) reproducing said facsimile message on a hard-copy medium; and (g) on the basis of the determination of step (e) concealing at least a portion of said confidential information in said reproduced facsimile message at said receiving station effective to maintain said confidential information concealed after said message has been removed from said receiving station.

61. The method of claim 60, wherein step (b) comprises:

(1) converting said facsimile message into a corresponding facsimile message signal, and (2) mixing said facsimile message signal with a first command code signal which corresponds with said first command code, so as to produce a composite facsimile signal, wherein step (c) comprises transmitting said composite facsimile signal to said selected receiving station, wherein step (e) comprises determining the presence of said first command code signal in said composite facsimile signal, and wherein step (f) comprises reproducing said facsimile message on a hard-copy medium, using said facsimile message signal.

62. The method of claim 60, wherein step (b) comprises providing said first command code in the form of a graphical code symbol associated with said facsimile message, wherein step (c) comprises transmitting said facsimile message and said graphical code symbol, from said transmitting station to said selected receiving station, wherein step (d)

comprises receiving said facsimile message with said graphical code symbol, wherein step (f) is performed prior to step (e) and comprises reproducing said graphical code symbol and said facsimile message, wherein step (e) comprises recognizing said reproduced graphical code symbol to determine the presence thereof, and wherein step (g) comprises concealing at least a portion of said confidential information in said reproduced facsimile message, on the basis of the determination in step (e).

63. Apparatus for producing secured hard-copy facsimile documents, comprising:

a housing of generally compact construction;

facsimile recording means disposed in said housing, for recording an information bearing facsimile message on a recording medium, using a received facsimile signal;

facsimile information concealing means, disposed in said housing, for concealing at least a portion of the information contained in said facsimile message to produce a secured hard-copy facsimile document;

command decoding means, disposed in said housing, for decoding said received facsimile signal so as to produce at least one command signal and for maintaining concealment of said information after said document has been removed from said apparatus; and control means, disposed in said housing, for selectively controlling the operation of said facsimile recording means and said facsimile information concealing means so as to conceal at least a portion of the information contained in said facsimile message to produce a secured hard-copy facsimile document.

64. Apparatus for producing secured hard-copy facsimile documents, comprising:

a housing of generally compact construction;

facsimile recording means, disposed in said housing, for recording an information bearing facsimile message on a recording medium, using a received facsimile data signal;

facsimile information concealing means, disposed in said housing, for concealing at least a portion of the information contained in said facsimile message to produce a secured hard-copy facsimile document, said facsimile recording means including a thermal recording means, and wherein said facsimile information concealing means comprises composite recording material supply means for supplying composite recording material having a thermal recording layer and an opaque information concealing layer; and control means, disposed in said housing, for selectively controlling the operation of said facsimile recording means and said facsimile information concealing means.

65. Apparatus for producing secured hard-copy facsimile documents, comprising:

a housing of generally compact construction;

facsimile recording means, disposed in said housing, for recording an information bearing facsimile message on a recording medium, using a received facsimile data signal;

facsimile information concealing means, disposed in said housing, for concealing at least a portion of the information contained in said facsimile message to produce a secured hard-copy facsimile document, said facsimile recording means including recording material supply means for supplying recording material, and recording material transport means for transporting said recording material, and wherein said facsimile information concealing means comprises information concealing material supply means for supplying information concealing material, information concealing transport means for transporting said information concealing material, and material layer merging and sealing means for merging and sealing said recording material and said information concealing material so that at least a selected portion of said facsimile information is concealed; and control means, disposed in said housing, for selectively controlling the operation of said facsimile recording means and said facsimile information concealing means.

66. Apparatus for producing secured hard-copy facsimile documents, comprising:

facsimile recording means, disposed in said housing, for recording an information bearing facsimile message on a recording medium, using a received facsimile data signal;

facsimile information concealing means, disposed in said housing, for concealing at least a portion of the information contained in said facsimile message to produce a secured hard-copy facsimile document, said facsimile recording means including recording material supply means for supplying recording material and recording material transport means for transporting said recording material, and wherein said facsimile information concealing means comprises enclosure supply means for supplying enclosures adapted to envelope a predetermined length of recording material and conceal at least a selected portion of said facsimile information, and envelope stuffing means for stuffing said predetermined length of recording material into said enclosure; and control means, disposed in said housing, for selectively controlling the operation of said facsimile recording means and said facsimile information concealing means.

67. Apparatus for producing secured hard-copy facsimile documents, comprising:

a housing of generally compact construction;

a facsimile recording means, disposed in said housing, for recording an information bearing facsimile message on a recording medium, using a received facsimile data signal;

facsimile information concealing, disposed in said housing, means for concealing at least a portion of the information contained in said facsimile message to produce a secured hard-copy facsimile document, said facsimile recording means further comprising recording material supply means for supplying recording material and recording material transport means for transporting said recording material, and said facsimile information concealing means further comprising recording material folding and sealing means for folding and sealing a predetermined length of said recording material so that a selected portion of said facsimile message is concealed; and control means, disposed in said housing, for selectively controlling the operation of said facsimile recording means and said facsimile information concealing means.

* * * * *